(12) United States Patent
Velke et al.

(10) Patent No.: US 6,438,930 B1
(45) Date of Patent: Aug. 27, 2002

(54) POWER LAWN MOWER WITH STAND-ON AND SIT-DOWN MODES WITH BATTERY LOCATED BETWEEN FEET OF OPERATOR

(75) Inventors: James D. Velke, Germantown; William R. Wright, Clarksburg, both of MD (US)

(73) Assignee: Wright Manufacturing, Inc., Frederick, MD (US)

( * ) Notice: Subject to any disclaimer, the term of this patent is extended or adjusted under 35 U.S.C. 154(b) by 0 days.

(21) Appl. No.: 09/714,814

(22) Filed: Nov. 17, 2000

Related U.S. Application Data

(63) Continuation-in-part of application No. 09/412,589, filed on Oct. 5, 1999, now Pat. No. 6,205,753.

(51) Int. Cl.$^7$ .................... A01D 34/03; A01D 34/43; A01D 34/64
(52) U.S. Cl. ........................... 56/14.7; 56/16.7
(58) Field of Search ................. 56/14.7, 15.5, 56/16.7, 15.4, 10.1, 323; 180/6.48, 6.5, 6.62, 19.3, 19.2; 710/87.043, 760, 32.7

(56) References Cited

U.S. PATENT DOCUMENTS

| | | | |
|---|---|---|---|
| 3,870,119 A | | 3/1975 | Wurst |
| 4,040,497 A | * | 8/1977 | Thomas .................... 180/53 R |
| 4,192,525 A | | 3/1980 | Clark |
| 4,198,092 A | | 4/1980 | Federspiel |
| 4,487,006 A | * | 12/1984 | Scag .......................... 56/14.7 |
| 4,770,440 A | | 9/1988 | Lander |
| 4,878,339 A | | 11/1989 | Marier et al. |
| 4,998,948 A | | 3/1991 | Osterling |
| 5,307,612 A | | 5/1994 | Tomiyama et al. |
| 5,463,853 A | | 11/1995 | Santoli et al. |
| 5,507,138 A | | 4/1996 | Wright et al. |
| 5,517,809 A | | 5/1996 | Rich |
| 5,564,721 A | | 10/1996 | Wians |
| 5,600,944 A | | 2/1997 | Wright et al. |
| 5,653,466 A | | 8/1997 | Berrios |
| 6,085,504 A | * | 3/1998 | Wright et al. ................. 56/14.7 |
| 5,765,347 A | | 6/1998 | Wright et al. |
| 5,785,453 A | | 7/1998 | Marty et al. |
| 5,809,755 A | | 9/1998 | Velke et al. |
| 5,809,756 A | | 9/1998 | Scag et al. |
| 5,842,707 A | | 12/1998 | Smith |
| 5,865,020 A | | 2/1999 | Busboom et al. |
| 5,913,802 A | | 6/1999 | Mullet et al. |
| 5,964,082 A | | 10/1999 | Wright et al. |
| 6,205,753 B1 | * | 10/1999 | Velke et al. ................. 56/14.7 |
| 5,984,031 A | | 11/1999 | Velke et al. |
| 6,059,055 A | | 5/2000 | Velke et al. |

FOREIGN PATENT DOCUMENTS

| | | | |
|---|---|---|---|
| JP | 5-97049 | 4/1993 | |
| JP | 10-191743 | * 7/1998 | .......... A01D/34/64 |

OTHER PUBLICATIONS

Great Dane Zero Turn Surfer, Technical Manual, WM05179, Mar. 1998, pp. 1–13.
Great Dane Zero Turn Chariot, Technical Manual, WM05163, May 1998, pp. 1–15.
Stand and Sit Mower Photos, p. 65, Trade Show in Louisville, KY, Jul. 1997.
ShortCut 1500, "Always Take a ShortCut", 4 pp., No Date.

* cited by examiner

*Primary Examiner*—Robert E. Pezzuto
*Assistant Examiner*—Árpád Fábián Kovács
(74) *Attorney, Agent, or Firm*—Nixon & Vanderhye P.C.

(57) ABSTRACT

A self-propelled power lawn mower is operated while an operator standing on a foot platform, or alternatively when sitting down on a selectively deployable seat. The battery (ies) may be located between feet of the operator in order to lower the overall center of gravity of the mower.

10 Claims, 26 Drawing Sheets

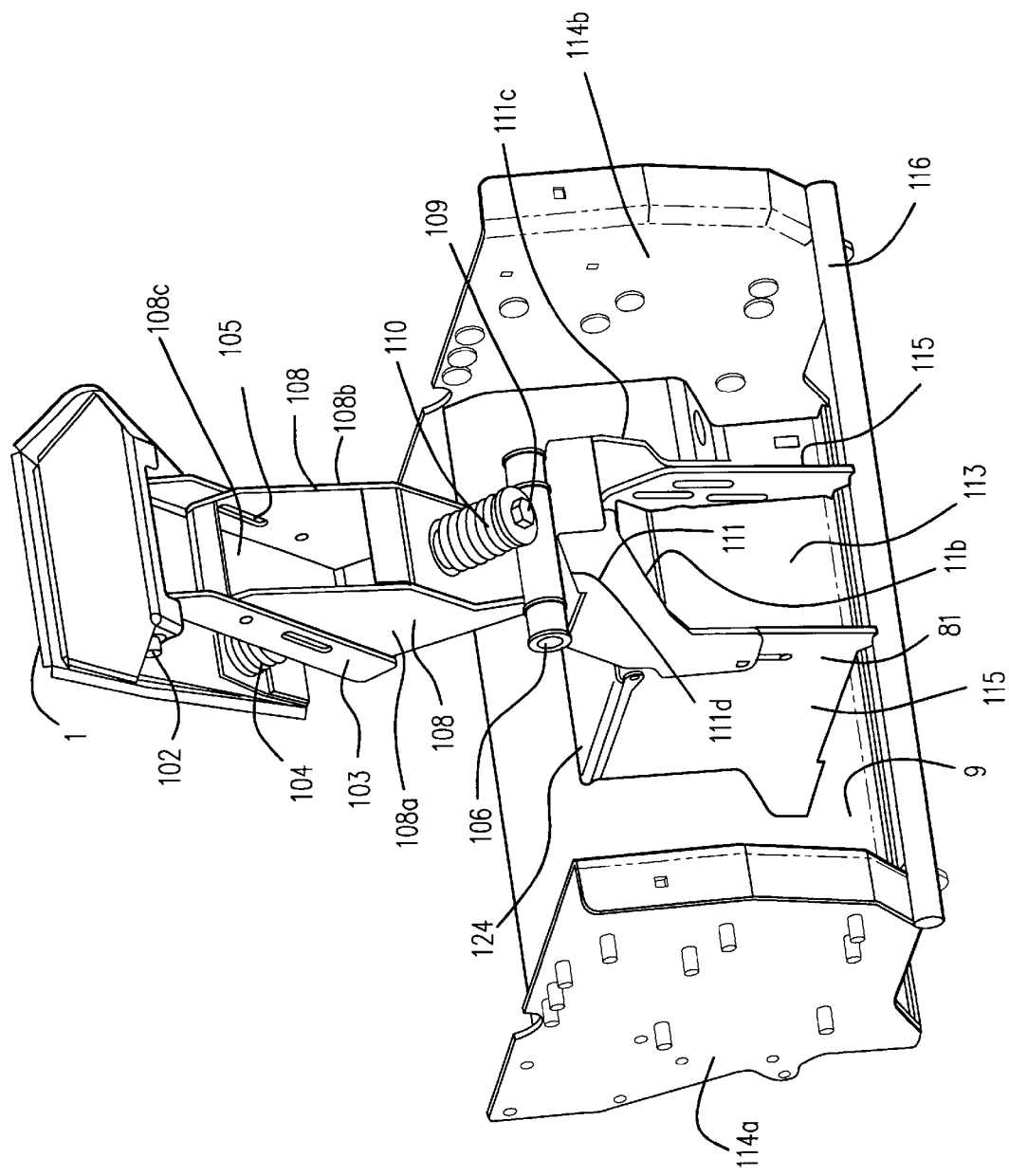

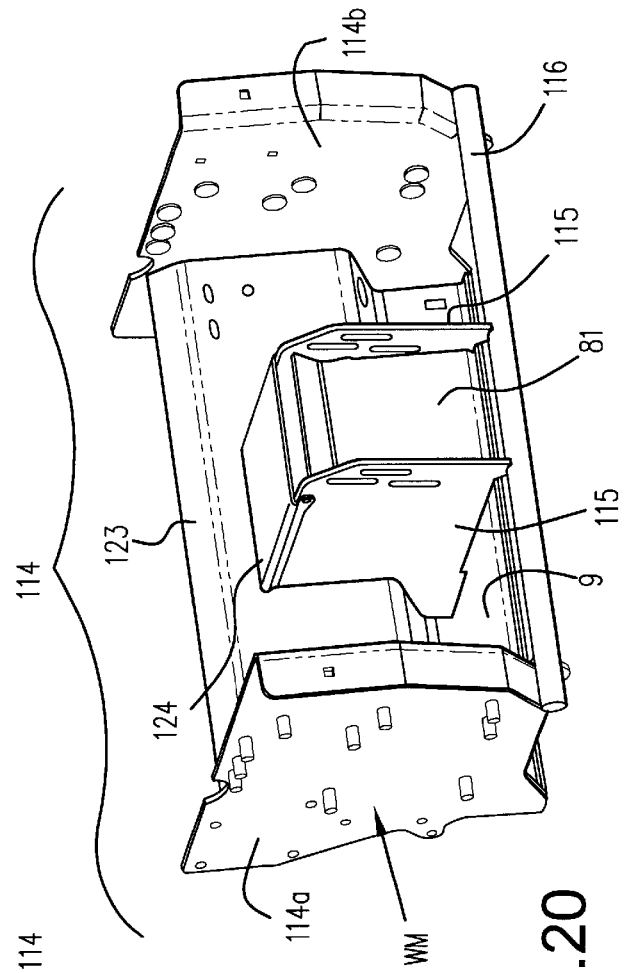
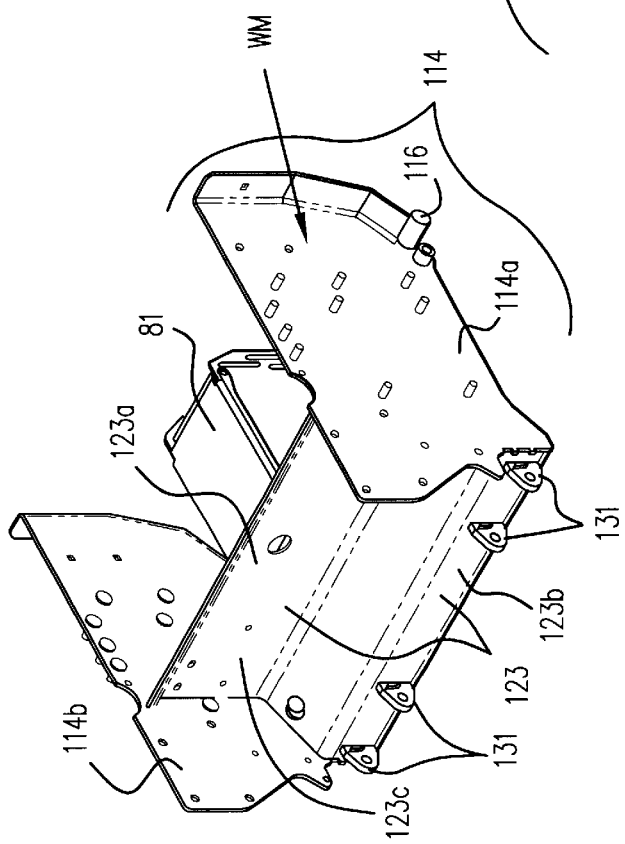
Fig.20
Fig.19

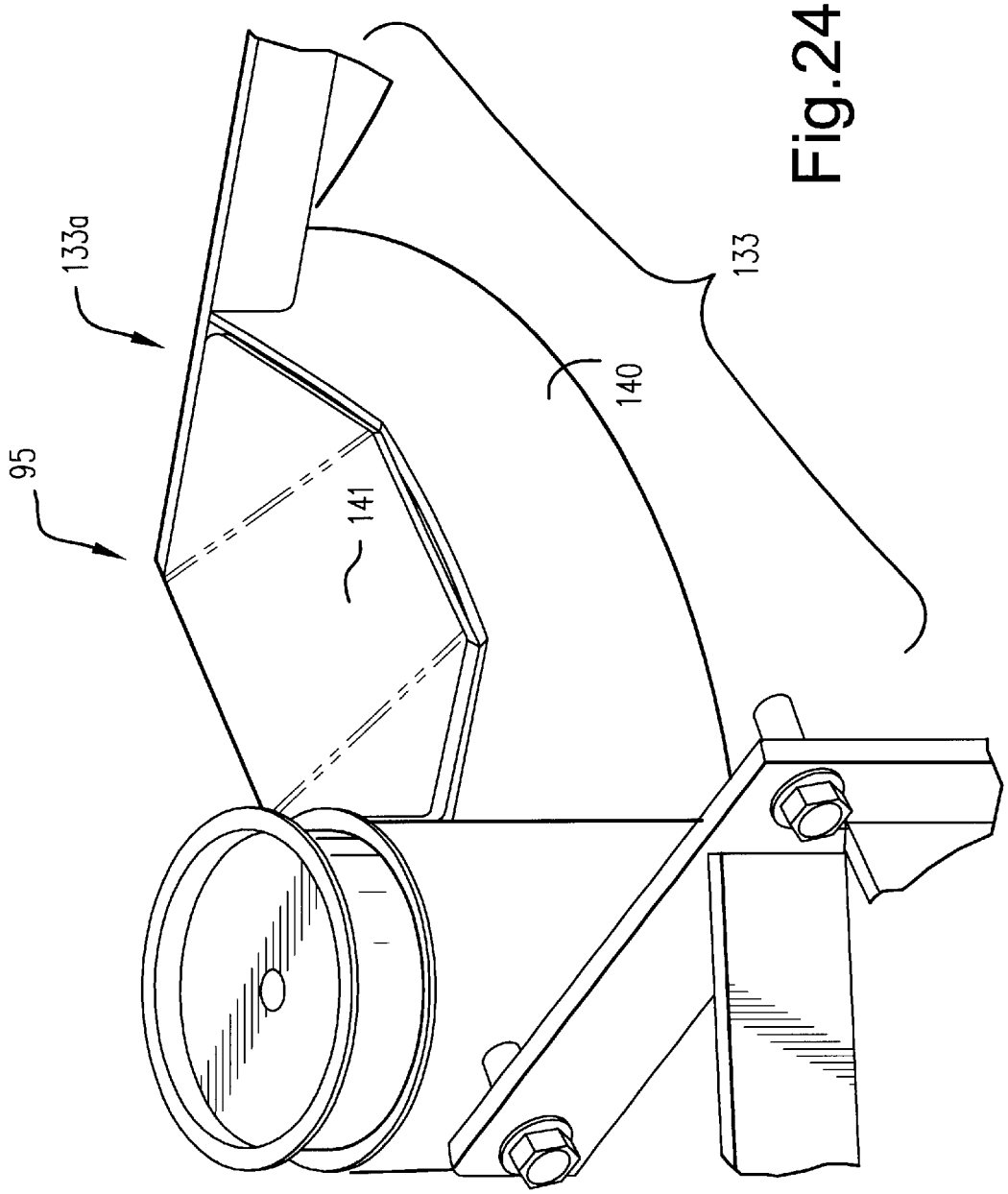

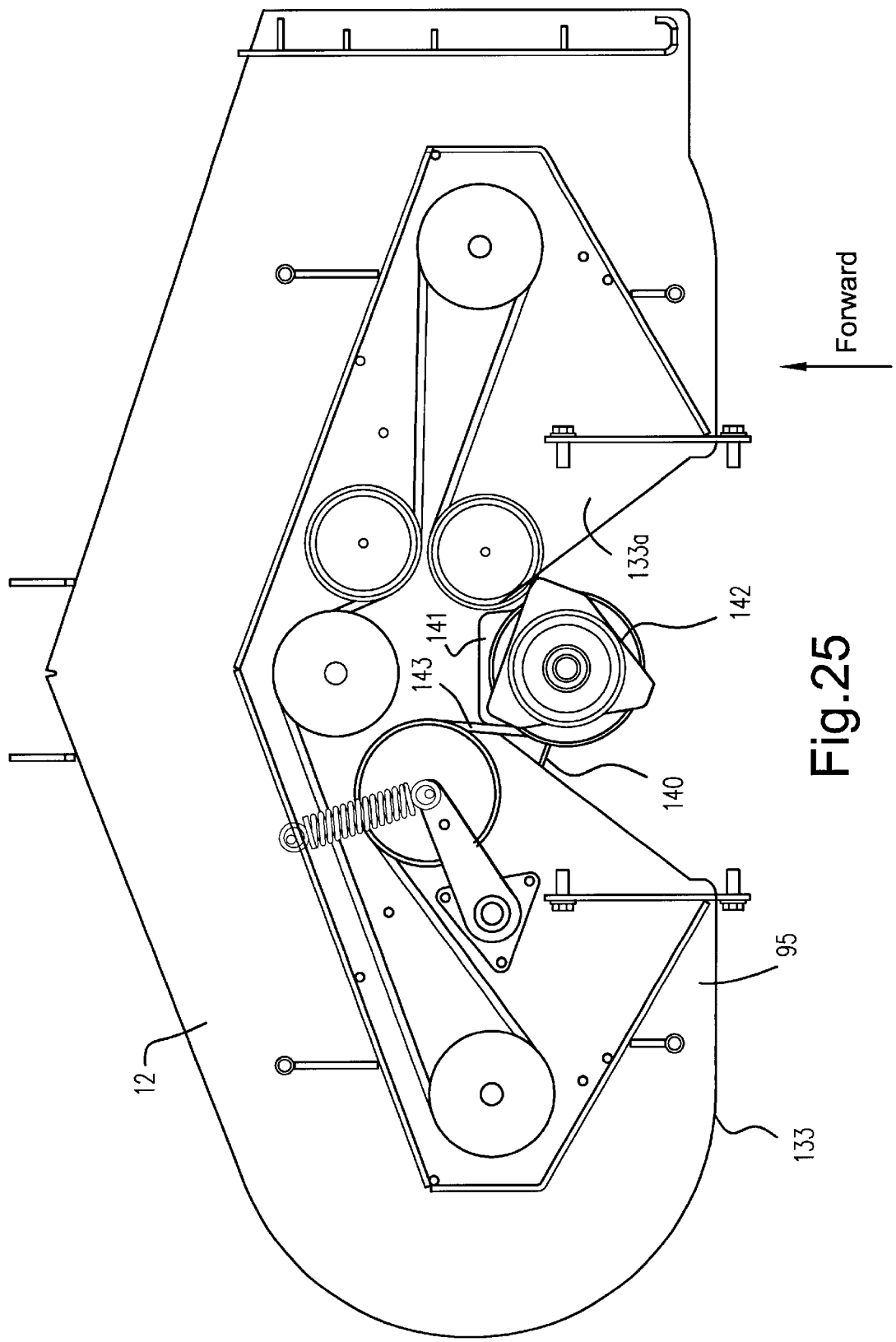

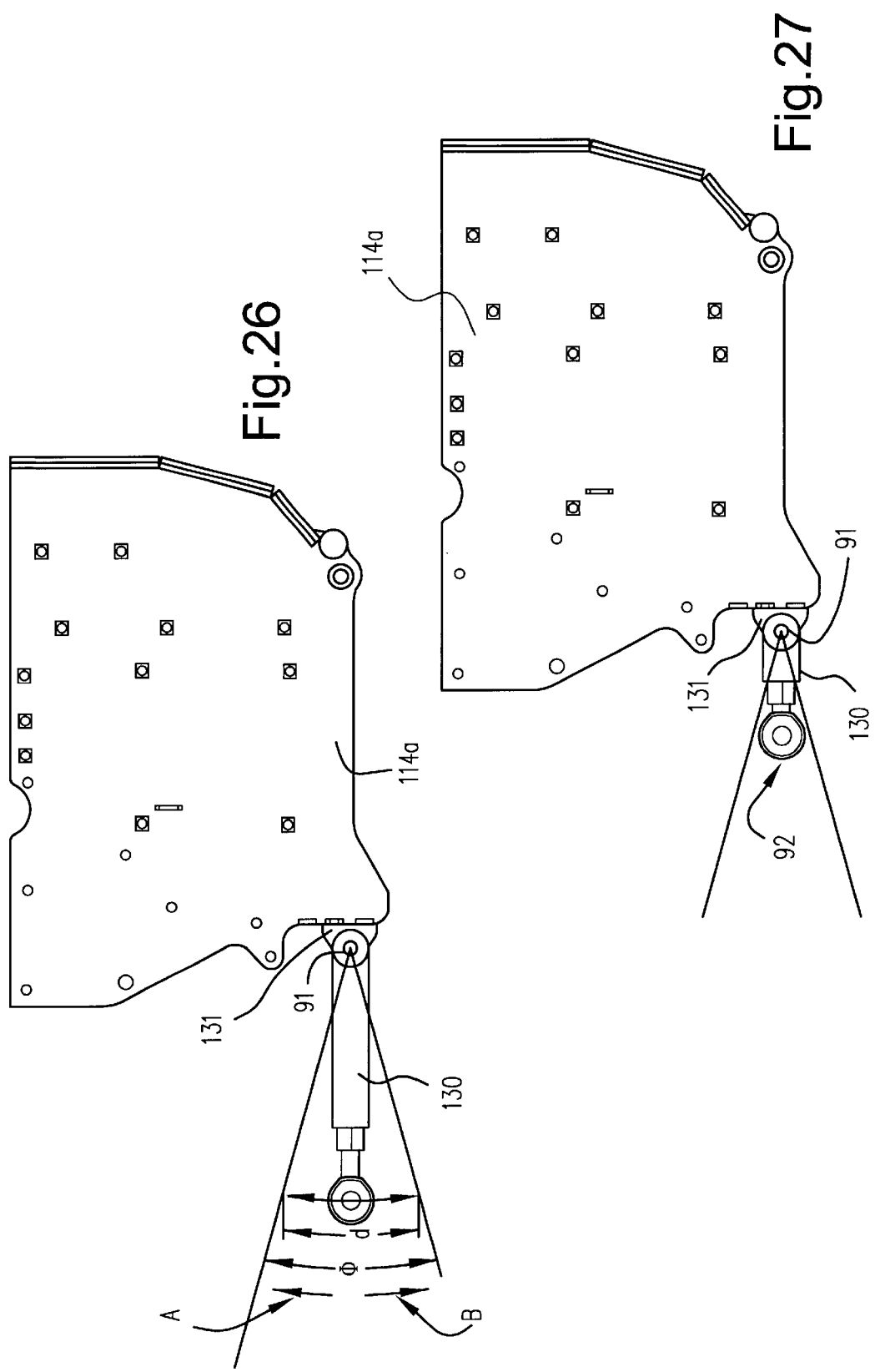

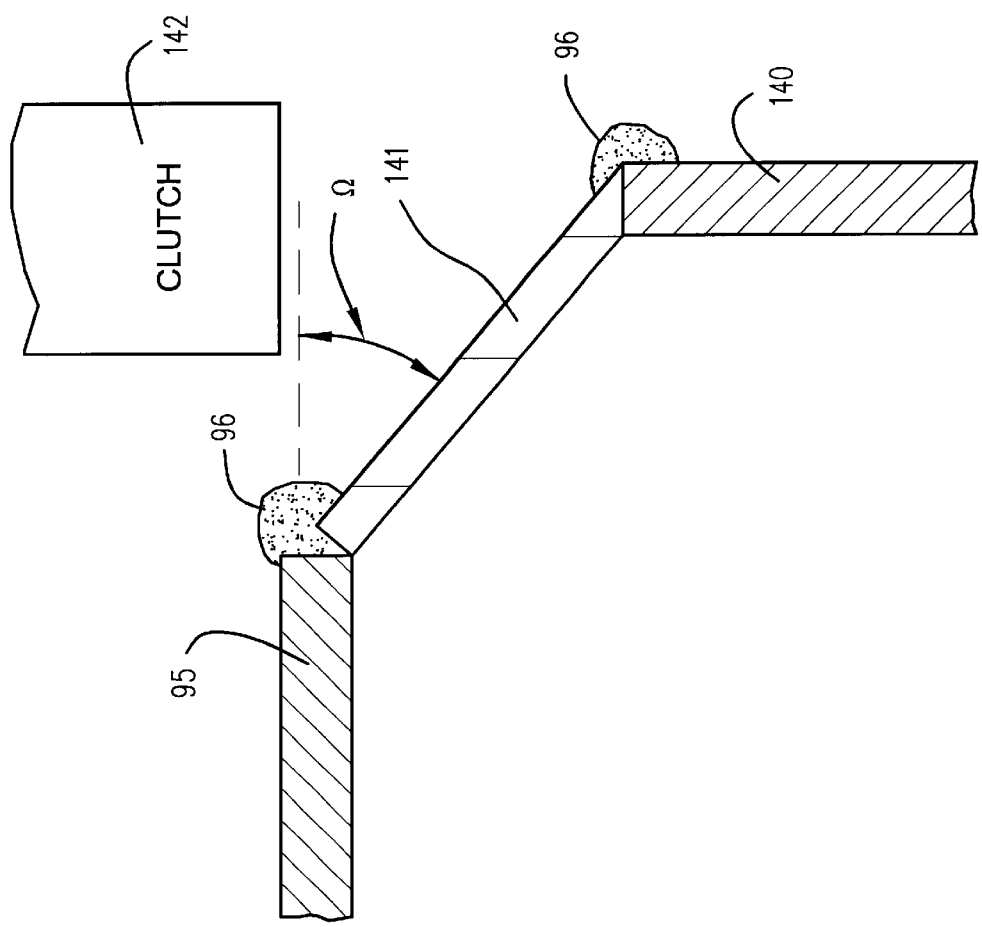

POWER LAWN MOWER WITH STAND-ON AND SIT-DOWN MODES WITH BATTERY LOCATED BETWEEN FEET OF OPERATOR

This application is a continuation-in-part (CIP) of U.S. Ser. No. 09/412,589, filed Oct. 5, 1999 (now U.S. Pat. No. 6,205,753), the disclosure of which is hereby incorporated herein by reference.

Known commercial power mowers are generally divided into three separate categories: self-propelled walk-behind mowers, ride-on mowers operated by a seated occupant, and stand-on mowers operated by a standing occupant.

For example, U.S. Pat. No. 4,920,733 discloses a typical walk-behind power mower. U.S. Pat. No. 5,865,020 discloses a typical ride-on mower where an operator sits on a seat during mower operation. U.S. Pat. Nos. 5,984,031, 5,964,082 and 5,507,138 disclose known stand-on mowers, each of these three patents hereby being incorporated herein by reference.

Unfortunately, the operator of a walk-behind mower must walk during mower operation (unless a sulky is used in conjunction therewith), thereby leading to fatigue. This is a disadvantage of walk-behind mowers, especially in hilly environments. As a result of operator fatigue, mowers controlled by walking operators are generally less productive over extended periods of time.

Conventional ride-on and stand-on mowers also suffer from certain disadvantages which will be apparent to the skilled artisan upon review of the instant specification. For example, conventional ride-on and stand-on mowers often end up locating the battery at a rather high location which is undesirable because it heightens the overall center of gravity of the mower. Finding suitable space for battery location is also problematic.

SUMMARY OF THE INVENTION

An object of this invention is to provide a power mower where the operator is capable of standing or sitting during different modes of mower operation.

Another object of this invention is to provide a mower where the battery(ies) can be located between feet of an operator in order to lower the overall center of gravity of the mower.

Another object of this invention is to provide a mower designed so that when going up a hill a mower operator can move from a sitting position to a standing position so that the overall center of gravity of the mower can be moved forward to minimize potential for tipping backward.

Another object of this invention is to provide a seat assembly which enables an operator to easily jump off of or abandon the machine.

Another object of this invention is to provide a seat on a mower, where the seat may be folded up into a storage or stowed position when the operator is standing on the mower or when there is a desire to transport or store the mower.

Another object of this invention is to provide a mower including a seat structure which is both comfortable and may be efficiently moved between deployed and non-deployed positions.

Another object of this invention is to provide a deck lift system which lifts an engine deck and a cutter deck together with one another, so that control arms utilized for positioning the deck can be designed to be shorter thereby enabling the deck assembly to be more resistant to negative impacts which may be caused by sideloads.

Yet another object of this invention is to satisfy or fulfill one or more of the above listed objects.

Certain embodiments of this invention fulfill one or more of the above-listed objects by providing a self-propelled power lawn mower comprising:

first and second rear drive wheels that are independently driveable so as to enable the mower to conduct approximate zero radius turns about a zero radius turning axis;

a foot platform for supporting at least one foot of an operator of the mower, said foot platform being located at an elevation less than an elevation of a top edge of at least one of said rear drive wheels; and a battery housing for housing a battery at a location such that at least a portion of the battery is positioned between feet of the operator and at least a portion of the battery is located at an elevation below an elevation of a horizontally aligned rotational axis of at least one of the rear drive wheels.

Certain embodiments of this invention fulfill one or more of the above-listed objects by providing a power lawn mower comprising:

at least one drive wheel or tire;

a foot platform for supporting at least one foot of a mower operator, at least a portion of said foot platform being located at an elevation less than an elevation of a top edge of said drive wheel or tire; and a battery located at least partially between feet of the operator.

In certain embodiments, at least a portion of the battery is located between the profiles of the opposing rear drive wheels. In optional embodiments, the entire battery is located between the profiles of the opposing rear drive wheels ("wheels" herein includes both tires and hubs). Such a location of the battery enables the overall center of gravity of the mower to be lowered thereby enabling more efficient mower operation.

IN THE DRAWINGS

FIG. 18 is a perspective view illustrating the seat structure attached to the tractor frame of the mower of FIGS. 9–17.

FIG. 19 is a perspective view of the tractor frame of the mower of FIGS. 9–18.

FIG. 20 is another perspective view of the tractor frame of the mower of FIGS. 9–19.

FIG. 24 is a close up perspective view of a portion of the cutter deck assembly of FIG. 23.

FIG. 25 is a top view illustrating a clutch and pulley system used in conjunction with the cutter deck assembly of FIGS. 23–24.

FIG. 26 is a schematic side view illustrating a control arm and its pivot ranges as it extends from the tractor frame according to one possible embodiment for use in conjunction with the FIGS. 9–25 embodiment of this invention.

FIG. 27 is a schematic side view illustrating a control arm and its pivot ranges as it extends from the tractor frame according to another possible embodiment for use in conjunction with the FIGS. 9–25 embodiment of this invention.

FIG. 28 is a side cross sectional view of a portion of the cutter deck assembly of FIGS. 23–24.

DETAILED DESCRIPTION OF CERTAIN EMBODIMENTS OF THIS INVENTION

Figure 1:
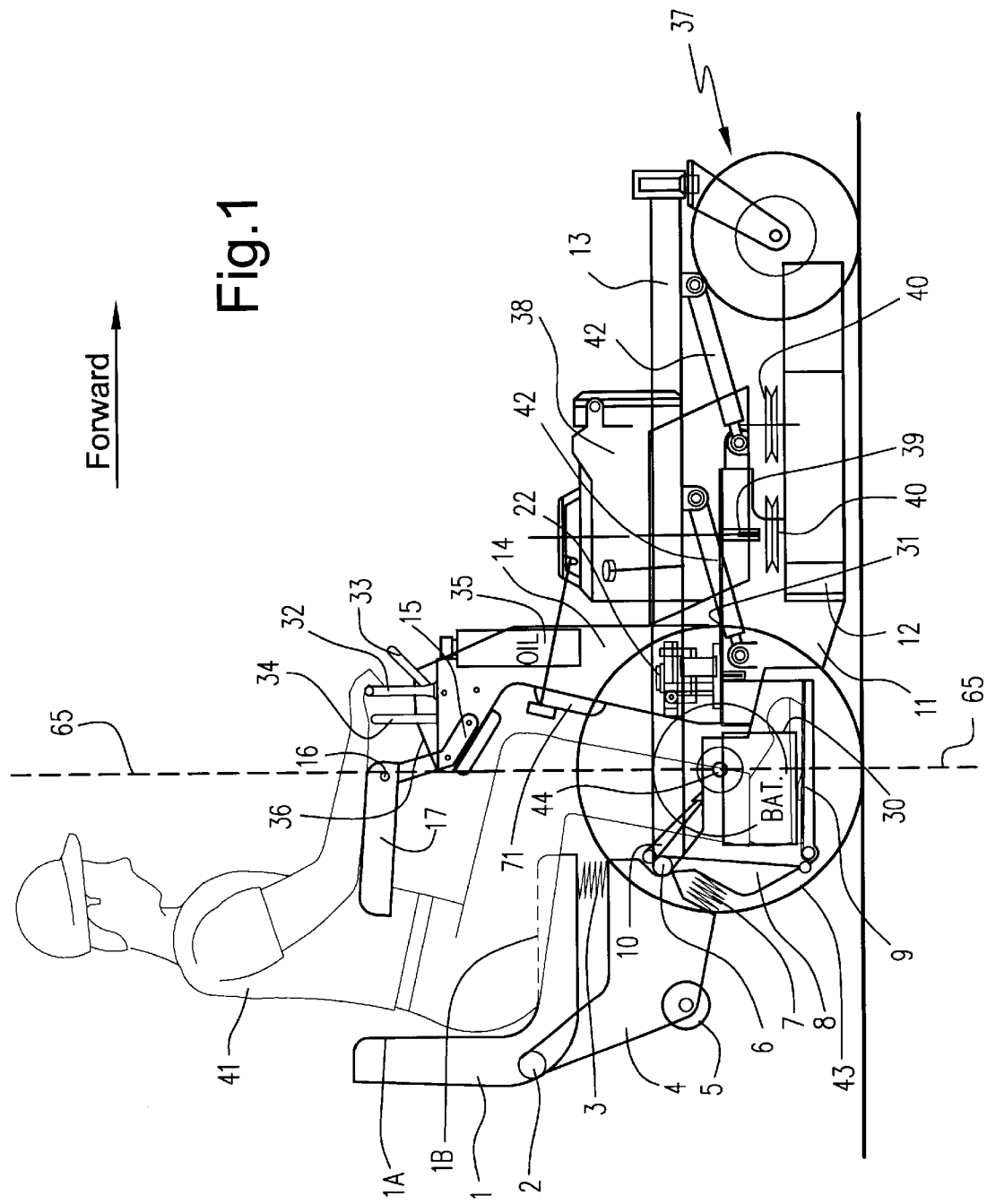
FIG. 1 is a side elevation view of a zero radius turning self-propelled power lawn mower according to a first embodiment of this invention, the mower including both standing and sitting modes and this FIG. showing the operator in a sitting position.

Referring now more particularly to the accompanying drawings in which like reference numerals indicate like parts throughout the several views.

FIGS. 1–4 and 8 illustrate a zero radius turning self-propelled power lawn mower according to a first embodiment of this invention. Operator 41 of the mower may use the mower either when sitting down on the seat or alternatively when standing up on the foot platform. In other alternative embodiments of this invention, the mower may be used primarily as a sit-down mower, or primarily as a stand-on mower.

Figure 2:
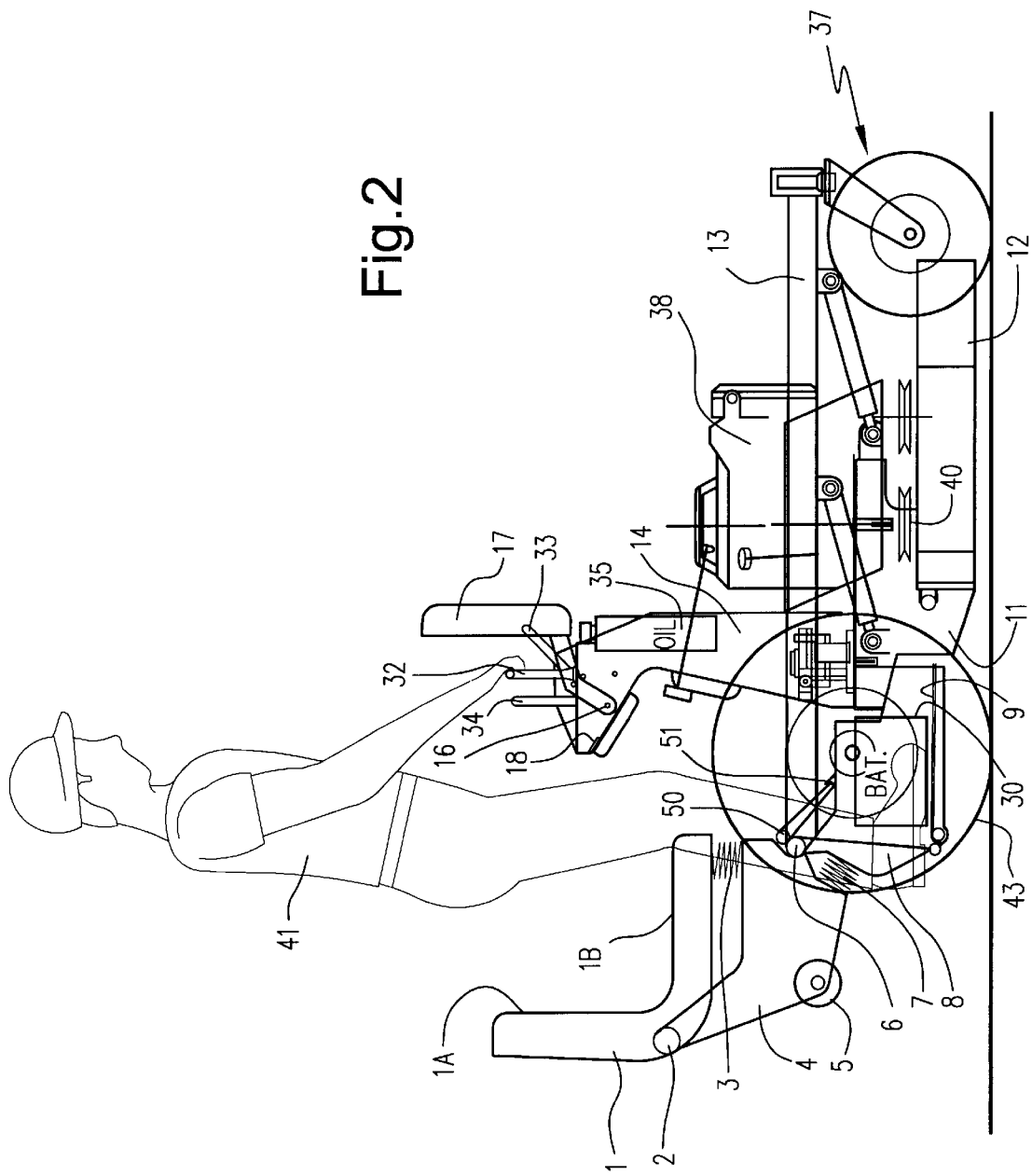
FIG. 2 is a side elevational view of the power mower of FIG. 1, showing the operator in a standing position on a foot platform.
Figure 3:
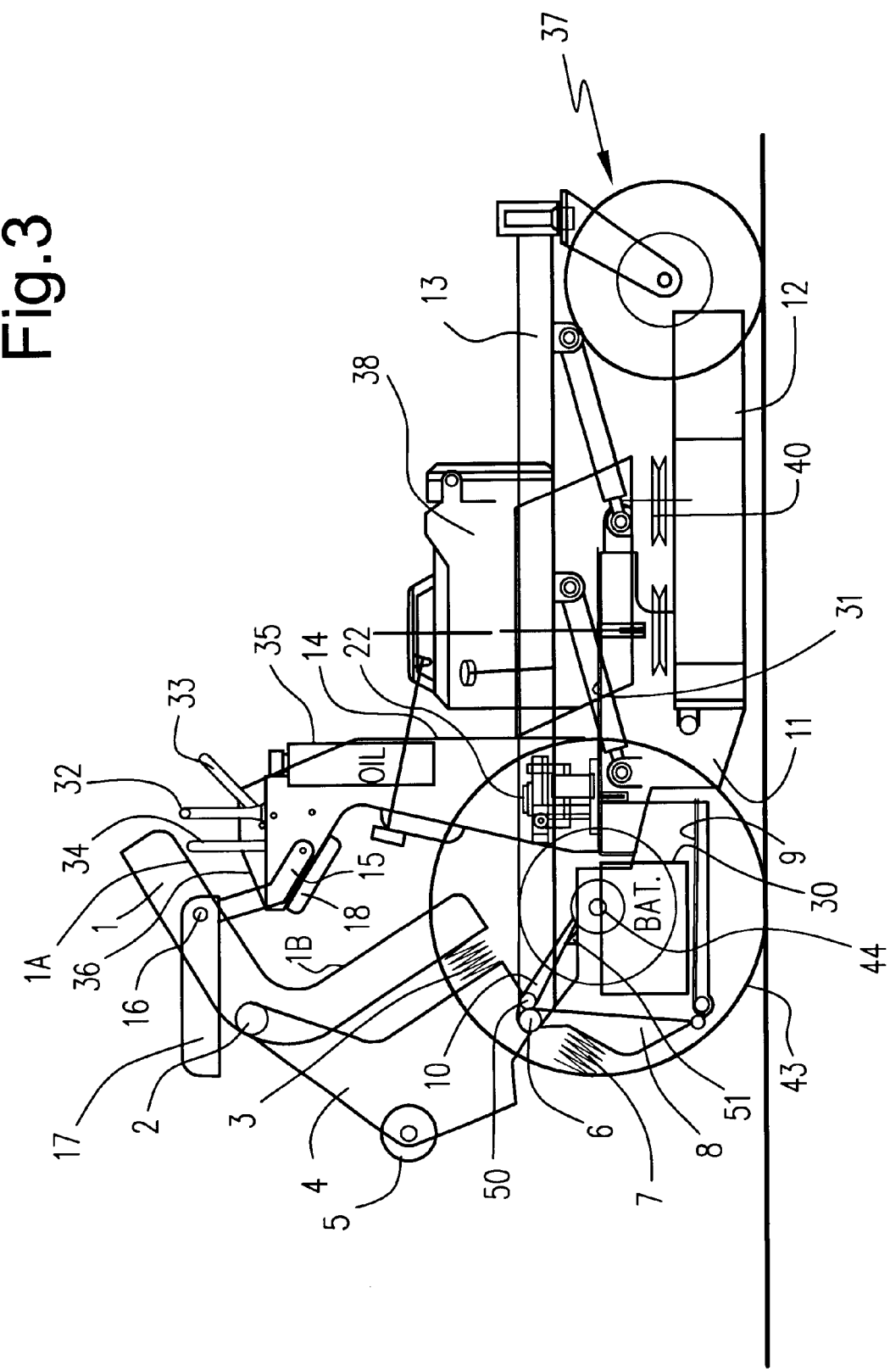
FIG. 3 is a side elevational view of the power mower of FIGS. 1–2, without an operator and showing the seat in a folded-up or stowed position.

Referring to FIGS. 1–4 and 8, the lawn mower includes: operator seat 1 for the operator to sit on during mower operation; seat pivot axis 2 about which seat 1 pivots or rotates; spring(s) or shock absorber(s) 3 for dampening the front of the seat for operator comfort; seat support or frame 4; wheelie roller(s) 5; pivot axis 6 for enabling seat support 4 to fold up along with the seat; spring(s) or shock absorber(s) 7 for dampening the rear of the seat for operator comfort; upwardly extending spaced apart and parallel supports or frames 8 provided between the operator's legs for supporting seat support 4 and for housing battery 30 or tools therebetween; stationary or pivotable foot platform 9 on which the operator may stand during mower operation; latch 10 for preventing seat 1 from folding up unexpectedly; engine frame weldment 11 connected to cutter or mower deck assembly 12 within which the cutting blades are provided; frame 13 for suspending or supporting cutter deck assembly 12 and/or engine frame weldment 11; engine deck 31 defining a plane upon which a pair of hydraulic or hydrostatic pumps 22 and the engine are mounted; a pair of laterally spaced side plates 14 extending upwardly from engine deck 31 or frame in order to support (directly or indirectly) at least (1) normally stationary handlebar 32, (2) a pair of spaced apart pivotable front handle grips 33 and a pair of spaced apart rear handle grips 34 (see U.S. Pat. No. 5,809,755, incorporated herein by reference), (3) hydraulic oil tank 35, (4) a pair of spaced apart arm rests 17 which may be padded, (5) a pair of arm rest support brackets 15, (6) corresponding arm rests pivots 16 for enabling the arm rests to fold up out of the way so that a standing operator can stand on either side of the platform without substantial interference from an arm rest, (7) pivot stop 18 for arm rest supports 15 to come to rest against when in a deployed position so as to support the arm rests, and (8) dashboard or console 36 including an hour gage (not shown); a pair of front casters or wheels 37 supported by frame 13 or alternatively by the cutter deck assembly 12; combustion engine 38 mounted on the plane of engine deck 31; engine shaft 39 extending from the engine downwardly through an aperture in the engine deck 31 for driving the cutter blades via belts and pulleys 40; operator 41 who may operate the mower either while seating on seat 1 as shown in FIG. 1 or when standing on platform 9 as shown in FIG. 2; control arms 42 which enable cutter deck 12 and engine deck 31 to move up and down relative to frame 13 and dampen movement therebetween; a pair of independently drivable rear drive wheels 43 which rotate about a common rear drive wheel axis 44; and right and left hand hydrostatically controlled rear drive wheel motors 45 (see FIG. 8) whose wheel driving direction and speed are controlled by pumps 22 via pivoting handle controls 33 and/or 34 as described in U.S. Pat. No. 5,809,755 which is incorporated herein by reference.

In certain embodiments of this invention, engine 38 is moved forward relative to certain conventional mowers so that drive shaft 39 thereof is located forward of the front edge of rear drive wheels 43 and also forward of the front edge of supports 14. Moreover, in certain embodiments, the entire engine 38 is located forward of the front edge of rear drive wheels 43. This forward positioning of the engine permits additional weight to be provided closer to the front of the mower in order to offset weight distributed by the operator when on seat 1.

The location, function, and structure of platform 9, hydro pumps 22, and wheel motors may be as shown and/or described in any of U.S. Pat. Nos. 5,765,357 or 5,809,755, both of which are hereby incorporated herein by reference.

Still referring to FIGS. 1–4 and 8, the left rear drive wheel may be driven in a forward direction by one motor 45 while simultaneously the right rear drive wheel is driven in a rearward direction by the other motor 45 at approximately the same speed so that the mower conducts an approximate zero radius turn about a vertical zero radius turning axis 65 that is spaced equal distance between the rear wheels 43 and extends upwardly through common rear wheel axis 44. Left hand pump 22 is in fluid communication with the left wheel motor 45 so that the drive direction and speed of left drive wheel 43 are controlled by pivoting left hand controls or levers 33 and 34; while right hand pump 22 is in fluid communication with right wheel motor 45 so that the drive direction and speed of right drive wheel 43 are controlled by pivoting right hand controls or levers 33 and 34. The right and left rear drive wheels 43 are thus controlled independently from one another in certain embodiments of this invention. Each rear drive wheel is preferably mounted on its own drive axle, and the axle of one wheel 43 may be part of the corresponding wheel motor 45 or alternatively may be separate from the motor. The same is true for the axle of the other rear drive wheel 43. In alternative non-zero radius turning embodiments, both rear drive wheels may be mounted on a single supporting axle.

In zero radius turning embodiments herein, at least a portion of foot platform 9 may be positioned so that the operator when standing on the platform is substantially uneffected by centrifugal force during zero radius turns of the mower. In certain embodiments, platform 9 may be positioned so that it is intersected by zero radius turning axis 65. In other embodiments, platform 9 is positioned relative to handle grips 32–34 so that the operator when standing on platform 9 and gripping a portion of the handle control assembly is substantially uneffected by centrifugal force created during approximate zero radius turns of the mower and at least a portion of his or her body may be on or near (e.g., within six inches of) the vertical turning axis 65. In certain embodiments, handle grips 32–34 are located forward of the vertical turning axis 65 and the platform rearward thereof so that the operator when standing on platform 9 is substantially uneffected by centrifugal force created during zero radius turns of the mower. In any of the above embodiments, at least a portion (or in some embodiments a substantial portion such as a thigh, head, torso, shoulder, chest, stomach, or the like) of the standing operator's body may be substantially at or near the vertical zero radius turning axis 65 during mower operations such as turning, going up hills, or during flat terrain operation.

In certain zero radius turning embodiments, hydrostatic pumps 22 are in conventional communication with hydrostatic motors 45 by way of, for example, a plurality of hydraulic fluid hoses (not shown) disposed between each pump and corresponding mower. Pumps 22 including known swash plates (not shown) generate hydraulic fluid pressure which is translated through one of two hoses connecting each pump 22 to a corresponding motor 45. The hydraulic hoses are coupled between each pump 22 and its motor 45 so as to allow hydraulic fluid to flow in both directions between each pump and its motor. One hydraulic hose may be provided for allowing hydraulic fluid to flow in one direction and another hose for permitting the fluid to flow in the opposite direction between a motor 45 and its corresponding pump 22. Each pump 22 includes a conventional pump control lever (not shown) extending therefrom for permitting the standing or sitting operator to control the speed and forward/reverse sense of each rear drive wheel via a hand lever(s) 33–34. Hydraulic pumps 22 may be driven by engine 38 via belts or any other suitable means. Alternatively, rear drive wheels 43 could instead be driven by chains or gears in a known manner, or by any other suitable variable speed devices.

Still referring to FIGS. 1–4 and 8, seat 1 may include an approximately upright section 1a as well as an approximately horizontal section 1b, so that seat 1 may be approximately L-shaped. The operator sits on portion 1b and may lean backwards against section 1a. As illustrated, seat 1 in certain embodiments is positioned entirely behind the zero radius turning axis 65 which extends upwardly through horizontal wheel axis 44. However, grip portions 32–34 of the handle control assembly may be located forward of axis 65 so that at least a portion of the operator's body can be on or near this turning axis 65 during sitting and/or standing operation of the mower. As shown in this particular embodiment, when in their deployed positions arm rests 17 are located behind vertical turning axis 65. However, in other embodiments arm rests 17 may be located on or forward of axis 65 depending on the preference of the operator or mower designer.

When the operator operates the mower when sitting on seat 1, the center of gravity of the combination of mower and operator is further rearward than when the operator is standing on platform 9. This is because the platform is located forward of the seat (preferably, a substantial portion of the platform is located forward of the front edge of the seat).

Seat 1 is designed so that seat portion 1b is elongated in forward and/or rearward directions. Therefore, the operator can adjust the position of his/her weight on the seat at various positions thereby causing the mower's center of gravity to move forward and/or rearward during operation. For example, the operator may sit on the middle of seat 1 during operation of the mower on flat terrain. However, when going down a hill, the operator may slide further back on seat 1 in order to put as much weight as possible on the rear drive wheels 43 to increase traction on the rear tires by offsetting front end weight when going down a hill. When mowing up hills, the operator may move from a sitting position to a standing position on platform 9 and lean forward over the handle control assembly in order to put additional weight on the front of the mower thereby reducing the potential of tipping rearwardly when going up hills. Alternatively, when going up a hill the operator may simply slide or move forward on the seat 1.

Springs or shock absorbers 3 and 7 are optionally associated with seat 1 and are provided for operator comfort during sitting modes. At least one spring or other biasing means 3 is positioned proximate and below a front portion of seat 1 to dampen vibration or movement of the front of the seat during mower operation. Spring(s) 3 is generally oriented in a vertical manner with its biasing axis being approximately vertical with respect to flat ground on which the mower travels. Meanwhile, at least one spring or other biasing means 7 is provided for dampening movement of a rear portion of seat 1. Spring 7 is oriented at an angle θ of from about 20°–90° (most preferably from about 30°–60°) relative to the vertical and thus relative to the axis of spring 3. Seat 1 is mounted on seat support 4. Support 4 and seat 1 may rotate or pivot together about fixed axis 6. Thus, when substantial weight is placed on the rear portion of seat 1, the seat together with support 4 tend to rotate in a counterclockwise direction as defined in FIG. 2 about axis 6. Spring(s) 7 biases support 4 and thus seat 1 against too much counterclockwise tendency, thereby dampening vibration felt by the operator during seated operation of the mower.

Seat 1 may be folded up in certain embodiments in order to shorten the length of the mower for transport and/or storage (or for the operator to operate the mower when standing). For example, seat 1 may be folded up from its deployed position (see FIGS. 1–2) to a non-deployed or stowed position (see FIG. 3). To do this, seat 1 together with support 4 is/are rotated clockwise about fixed pivot axis 6 from the FIGS. 1–2 position to the folded-up FIG. 3 position (i.e., to the stowed position). In preferred embodiments, pivot axis 6 is positioned forward of the rear edge of rear drive wheels 43 but rearward of common horizontal wheel axis 44 so that the seat assembly when folded upwardly provides for a more compact mower. Optionally, pivot latch 10 may be provided so that the seat assembly cannot be folded up unexpectedly. Alternatively, no pivot latch 10 need be provided in certain embodiments.

Optionally, an operator presence control (OPC) switch may be associated with platform 9 in certain embodiments of this invention. Such an OPC switch may cause the mower and/or blades to turn off when the operator leaves or steps off of the platform in certain embodiments. An exemplary OPC switch associated with the platform is disclosed and described in U.S. Pat. No. 5,809,755, incorporated herein by reference. Alternatively, in other embodiments, a similar OPC switch may be associated with the handle control assembly so that the mower engine and/or blades shut off if and when the operator's hands are removed from the handle control assembly during operation. It is preferred that the mower not be equipped with a single OPC switch associated with only the seat, due to the need for potential standing operation during certain conditions (although, in certain alternative embodiments an OPC switch associated only with the seat may be utilized).

Figure 4:
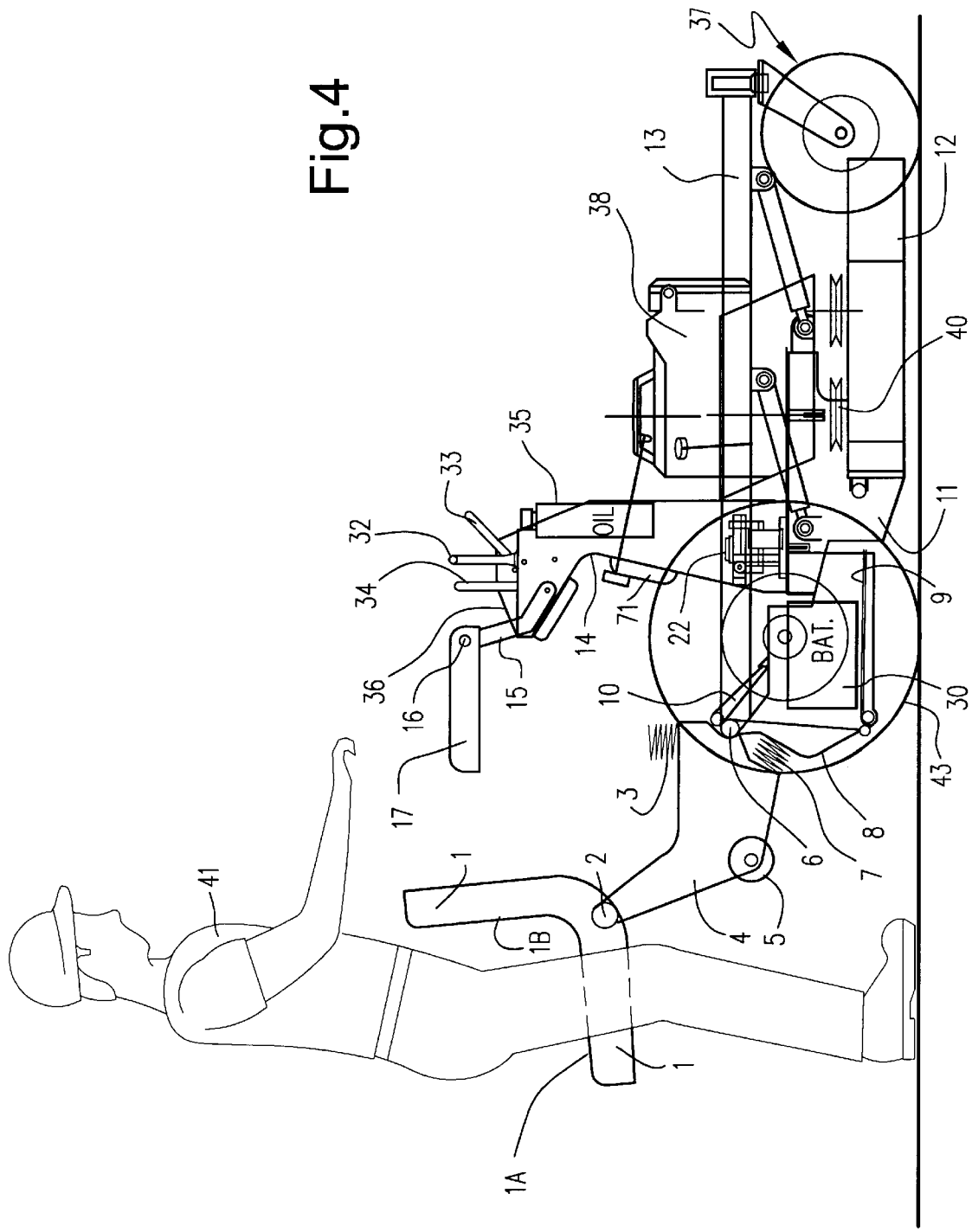
FIG. 4 is a side elevational view of the power mower of FIGS. 1–3, showing an operator getting on or off of the mower, wherein the seat is pivoted about a pivot as the operator moves forward or rearward.

The seat assembly of the mower of FIGS. 1–4 and 8 is designed so that it is easy for an operator 41 to get off of or onto the mower. FIG. 4 illustrates an operator either getting onto or off of the mower by allowing seat 1 to pivot about axis 2 as the operator moves either forward or rearward. For example, assuming that the operator 41 is getting on the mower as shown in FIG. 4, operator 41 straddles portion 1a of the seat with his/her legs, and as the operator moves forward he/she contacts and pushes downward on portion 1b of the seat so that as the operator sits down the seat 1 rotates clockwise about pivot axis 2 until it reaches the FIGS. 1–2 position. Thus, the operator does not have to crawl over an entire seat assembly in order to get on the mower. Such a pivoting seat is optional and need not be provided in all embodiments of this invention.

Still referring to FIG. 4, when an operator 41 desires to get off of the mower from a seated position, the operator 41 may simply push his/her back rearwardly against the top of section 1a of the seat thereby causing the seat to rotate counterclockwise about pivot axis 2 into its FIG. 4 position as the operator rearwardly leaves the mower. This enables the operator to get off of the mower without having to crawl over top of a fixed seat assembly.

As shown in FIG. 4, approximately horizontal pivot axis 2 may be positioned at an elevation at or above the surface of seat section 1b and axis 6 during normal mower operation (see FIGS. 1–2). Such a positioning of axis 2 makes it less likely for seat 1 to be pivoted counterclockwise about axis 2 unintentionally or accidentally. It is also noted that the two optional arm rests 17 are supported and connected to side supports 14 (instead of the seat) so that the arm rests need not interfere with an operator getting on or off of the mower. In alternative embodiments, the optional arm rests may be supported by the seat itself or any other suitable structure.

The first and second laterally spaced side supports 14 are attached to and extend upwardly from the plane of engine deck 31. In such embodiments, control rods operatively connected to pivoting levers 33–34 may be utilized and extend between the levers and corresponding pumps 22 in order to control rear drive wheel direction and/or speed.

Figure 7:
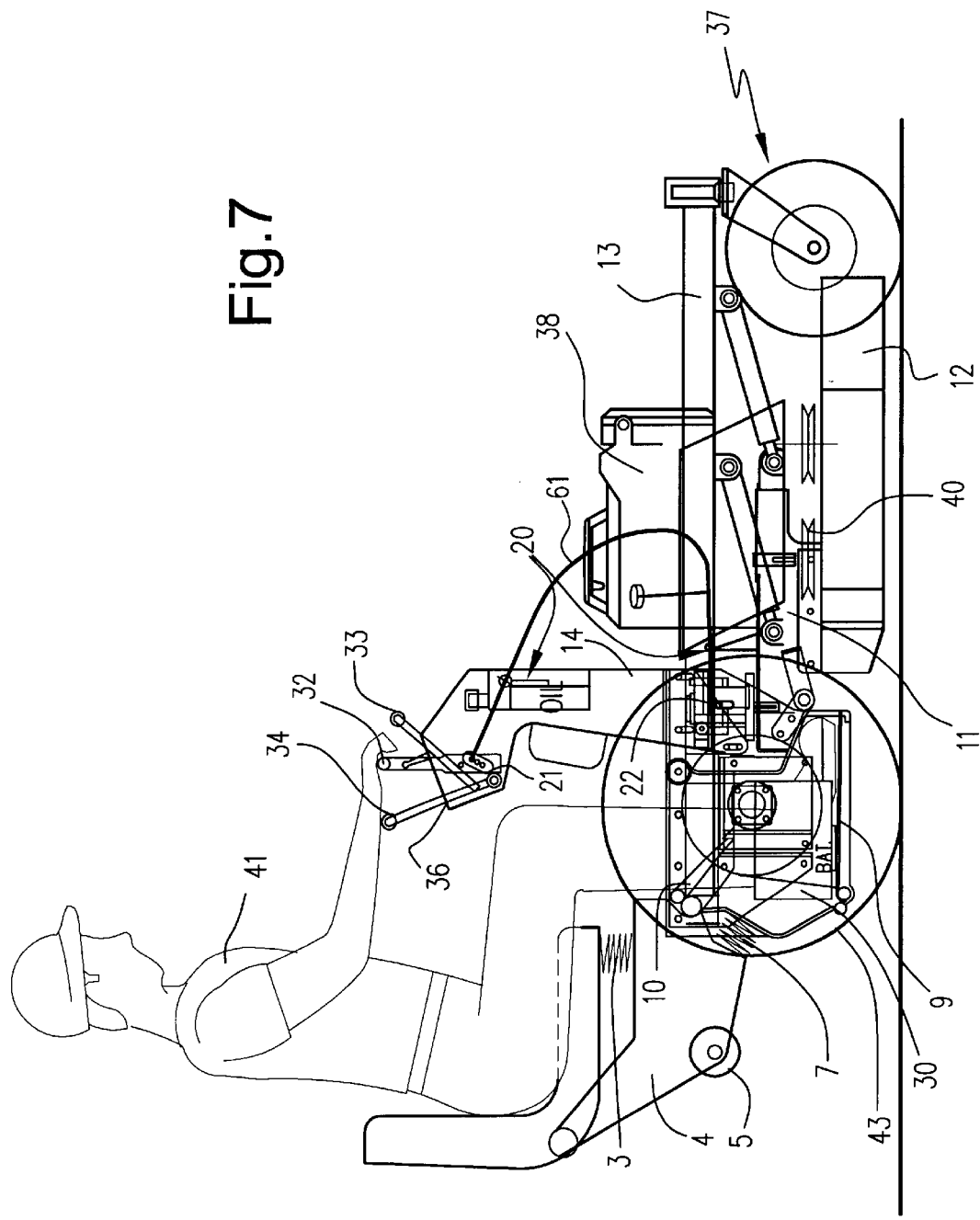
FIG. 7 is a side elevation view of a zero radius turning self-propelled power mower according to a third embodiment of this invention, the mower including both standing and sitting modes, as well as control cables; this FIG. showing the operator in a sitting position.
Figure 8:
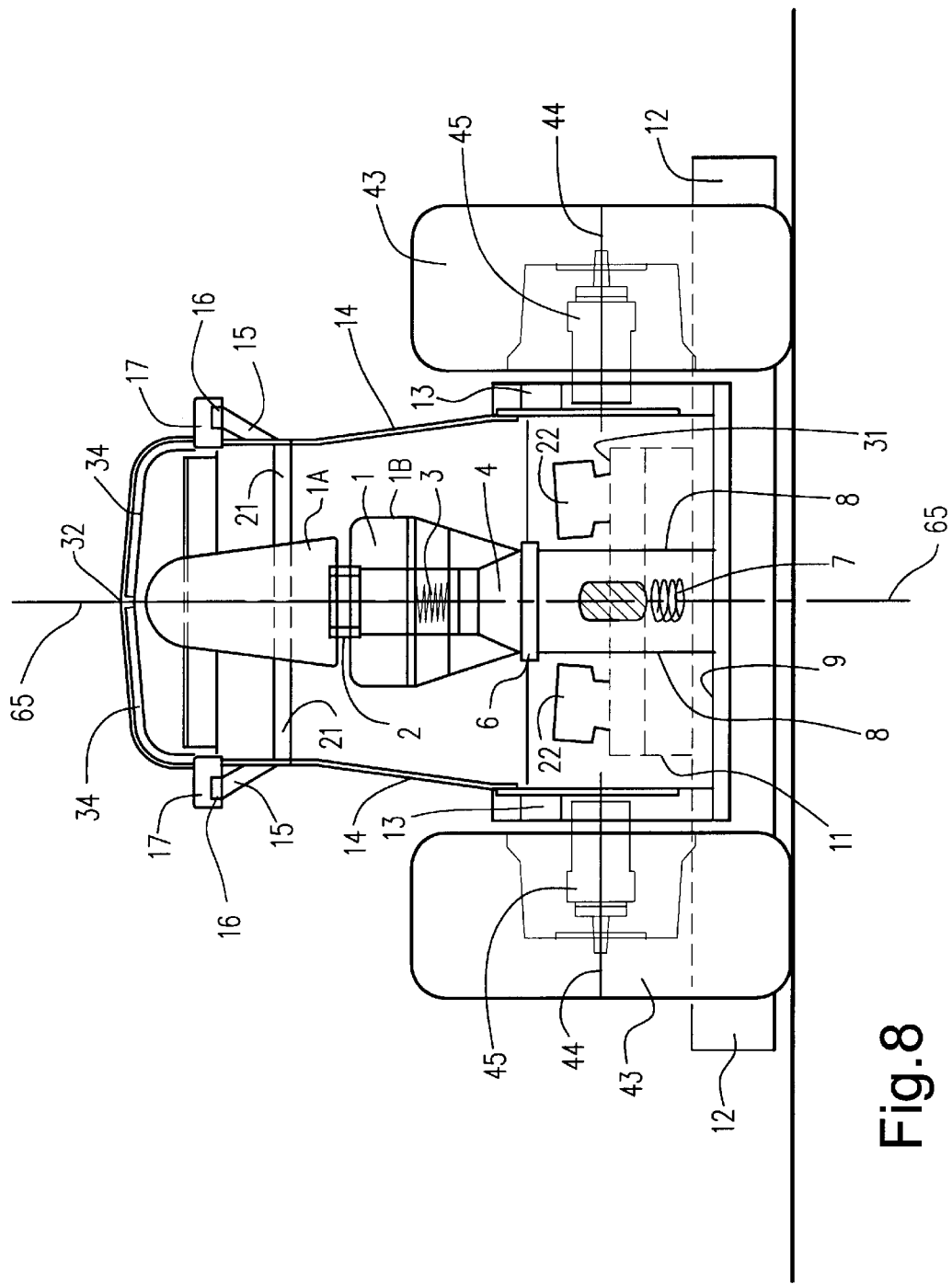
FIG. 8 is a rear elevational view of the mower of FIGS. 1–4, absent an operator.
Figure 9:
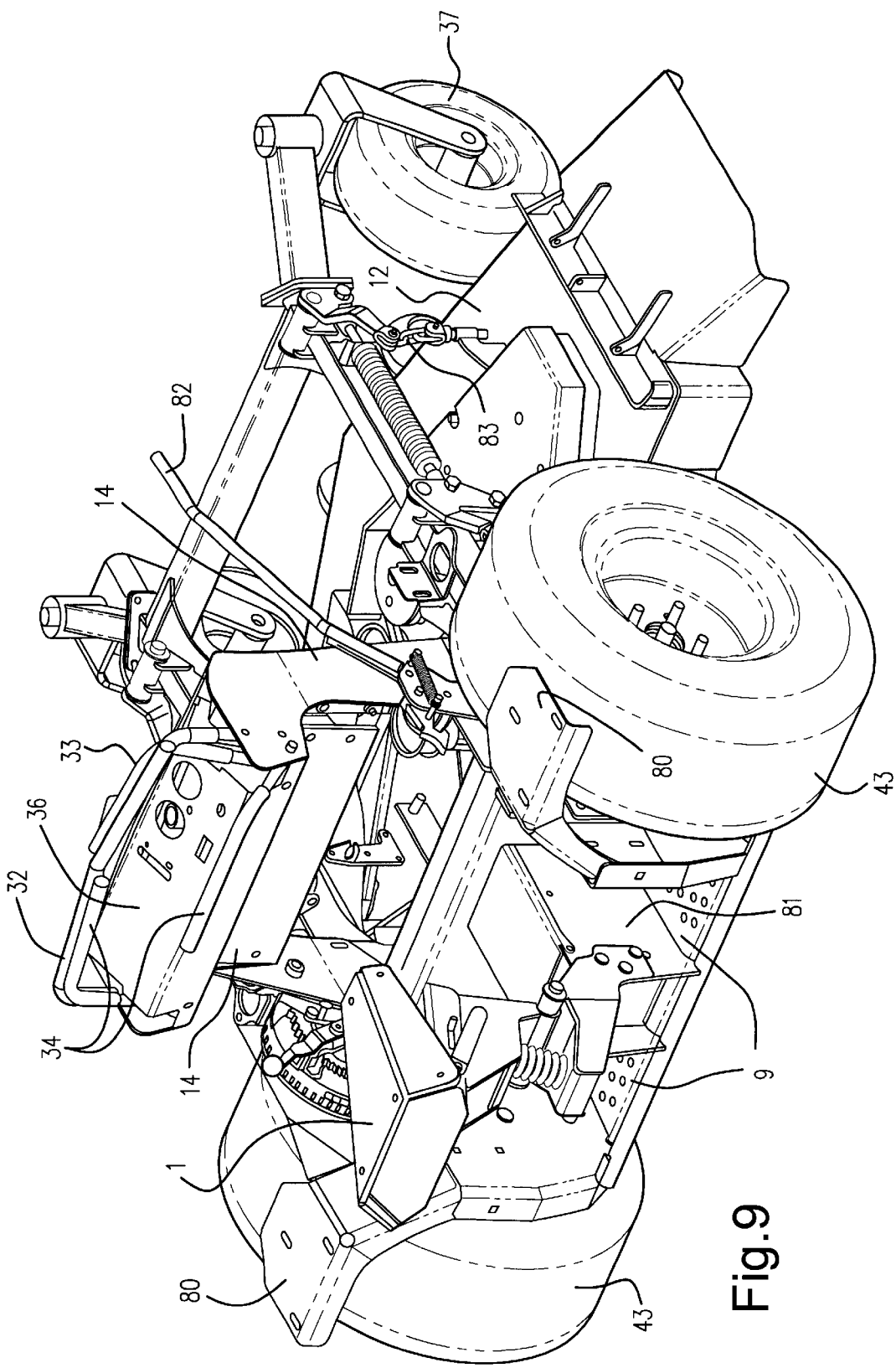
FIG. 9 is a perspective view of a zero radius turning self-propelled power mower according to a fourth embodiment of this invention, the mower including both standing and sitting modes; this figure illustrating the seat in a deployed position.

FIG. 7 illustrates another embodiment of this invention, wherein first and second elongated flexible control cables 61 replace the above-described control rods. First and second similar cables 61 extend between levers 33–34 and the corresponding pumps 22, thereby allowing pivoting movement of levers 33–34 to control the speed and/or drive direction of rear drive wheels 43. Cables 61 are preferred in the FIG. 7 embodiment, because the elevation of the engine deck 31, cutter deck assembly 12, and pumps 22 is/are adjustable upwardly and downwardly relative to the height of the handle control assembly 32–34. This is because the engine deck upon which engine 38 and pumps 22 are mounted is suspended from frame 13 and is adjustable upwardly and downwardly along with cutter deck 12 relative to the frame 13 in order to adjust the cutting height of the mower. In the FIG. 7 embodiment, no arm rests are provided.

Cables 61 of the FIG. 7 embodiment are push/pull type cables which act similar to flexible rods and are resistant to buckling. When cables 61 are pushed forward or downward by forward pivoting of lever 34 and/or lever 33, this causes a pushing force to be applied to pump 22 in a direction going toward the rear of the mower as shown in FIG. 7. Cables 61 are preferred when the handle control assembly is mounted at an elevation independent from and variable relative to the height of the engine deck 31 and pumps 22. However, cables 61 need not be utilized in all such embodiments.

Figure 5:
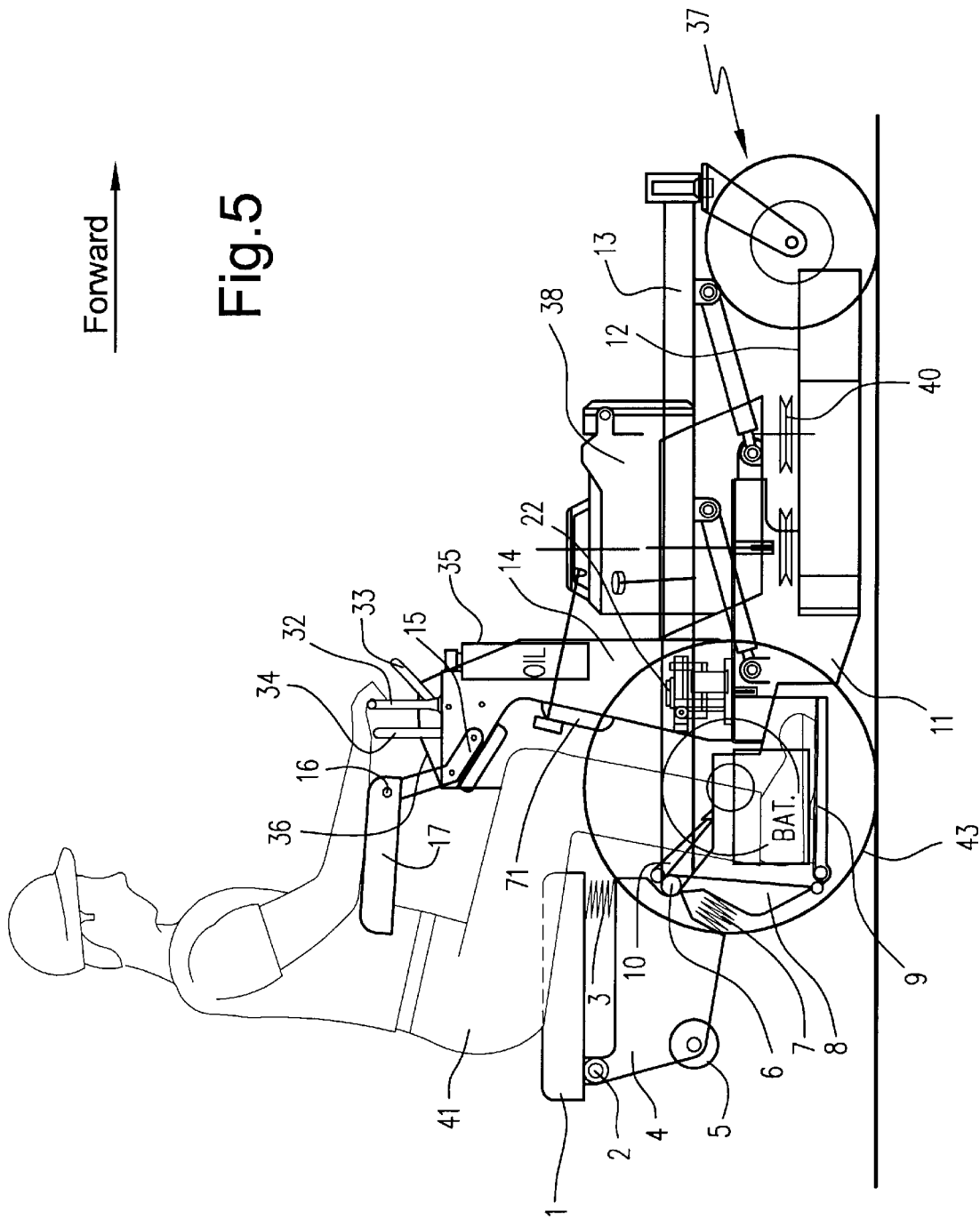
FIG. 5 is a side elevational view of a zero radius turning self-propelled power mower according to a second embodiment of this invention, the mower including both standing and sitting modes and this FIG. showing the operator in a sitting position.
Figure 6:
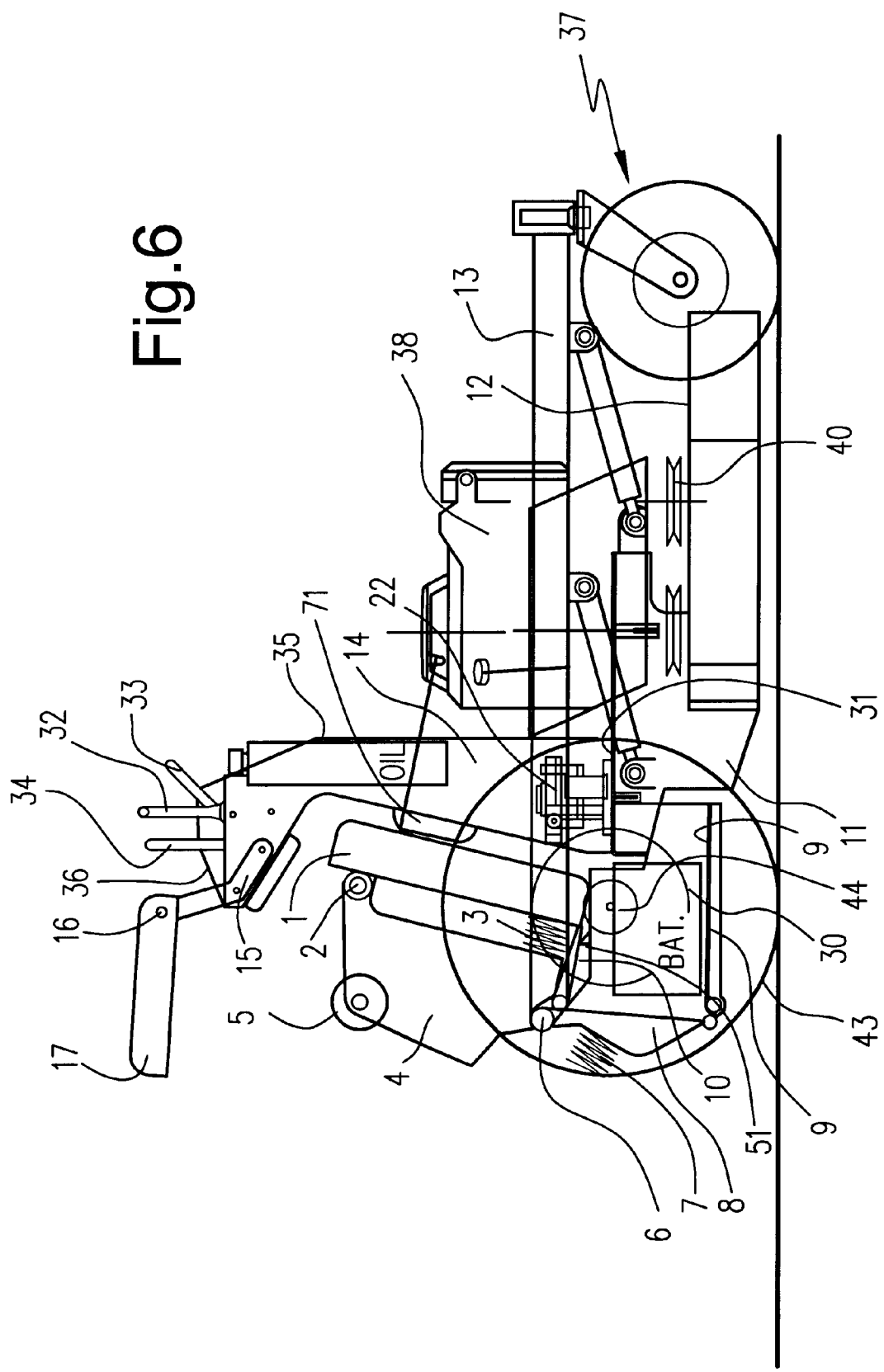
FIG. 6 is a side elevation view of the mower of FIG. 5, showing the seat folded up absent an operator.

FIGS. 5–6 illustrate a self-propelled zero radius turning mower according to yet another embodiment of this invention. The FIGS. 5–6 embodiment differs from the FIGS. 1–4 and 8 embodiment in that in FIGS. 5–6 the seat 1 is generally flat and does not have a back portion. FIG. 5 illustrates seat 1 in a deployed position with the operator sitting on the mower. FIG. 6 illustrates seat 1 in a folded up position or stowed position, with seat 1 and support 4 having been rotated clockwise about pivot axis 6. In certain embodiments herein, pad or cushion 71 may be mounted on a rear surface or edge of side supports 14 so as to cushion the knees of the operator against banging into supports 14 during riding and/or sitting operation of the mower, and/or to provide a rest up against which seat 1 can contact in a stowed position.

FIGS. 9–25 illustrate a zero radius turning self-propelled power lawn mower according to a fourth embodiment of this invention. This mower includes first and second hydro pumps for controlling first and second corresponding wheel motors, so that the first and second rear drive wheels 43 may be driven independently in order to conduct zero radius turns as discussed above. Referring to FIGS. 9–13, the mower includes: independently drivable rear drive wheels 43; cutter deck assembly 12 below which the cutting blades cut grass; front caster wheels 37; foot platform 9; seat 1; gas tank supports 80 for supporting respective gas tanks; battery housing structure 81 for housing a battery 30 and which also functions to help support the seat assembly; steering control levers 32 and 34 which enable the rear drive wheels 43 to be independently drivable in opposite directions at the same time so as to enable the mower to perform zero radius turns about a vertical zero radius turning axis 65; vertically extending support plates 14 which support console 36 and handle grips 32–34; and deck lift lever 82 which enables the cutter deck assembly 12 together with the engine deck 31 to be raised and lowered together in order to adjust the height of the mower cut. For example, when deck lift lever 82 is pulled upwardly, the cutter deck assembly 12 together with the engine deck 31 is raised so as increase the height of the mower cut. Chain linkage 83 suspends the deck assembly 12 and 31 and enables it to be raised and lowered in accordance with the position of lever 82.

Figure 10:
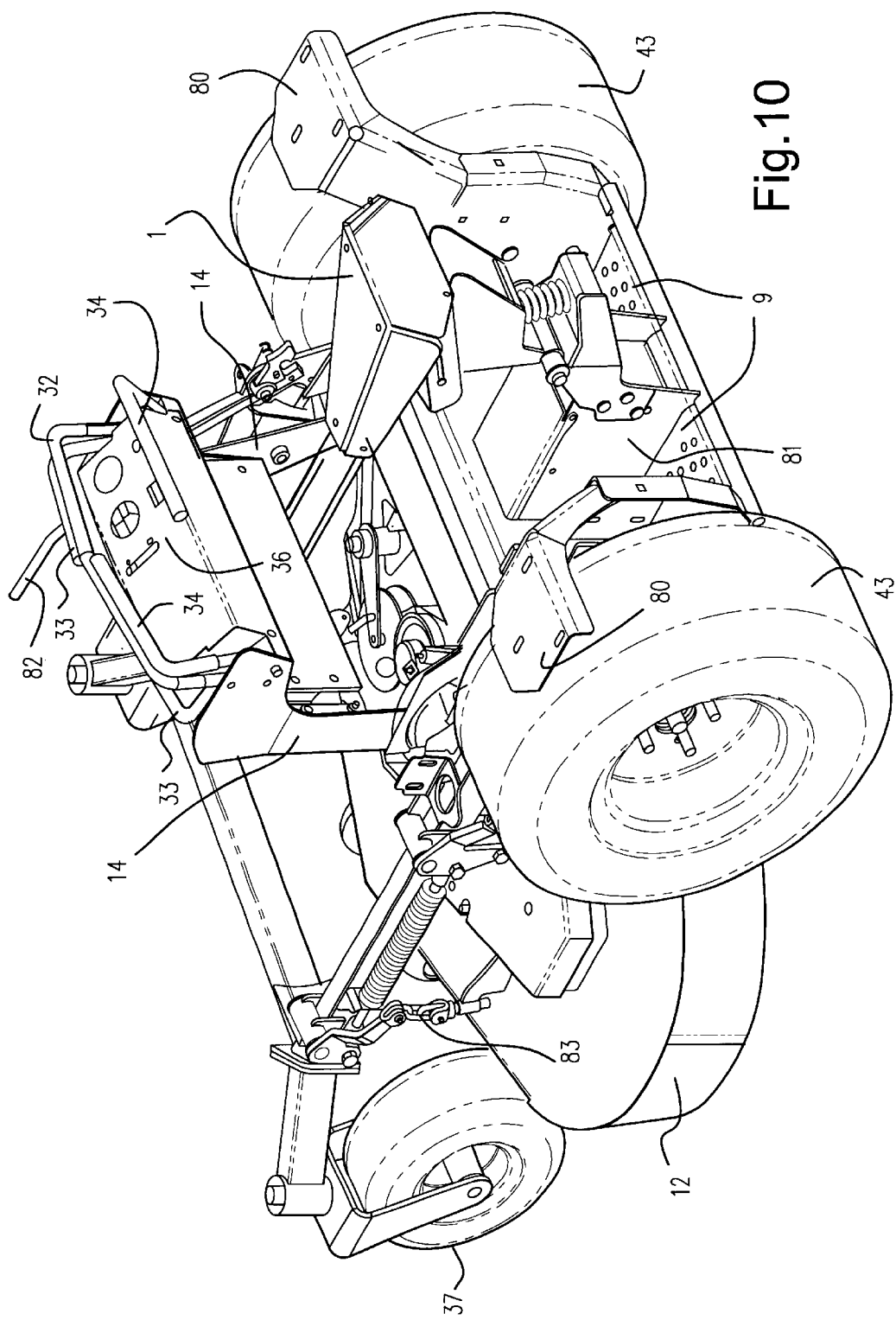
FIG. 10 is a perspective view of the power mower of FIG. 9, again illustrating the seat in a deployed position.
Figure 11:
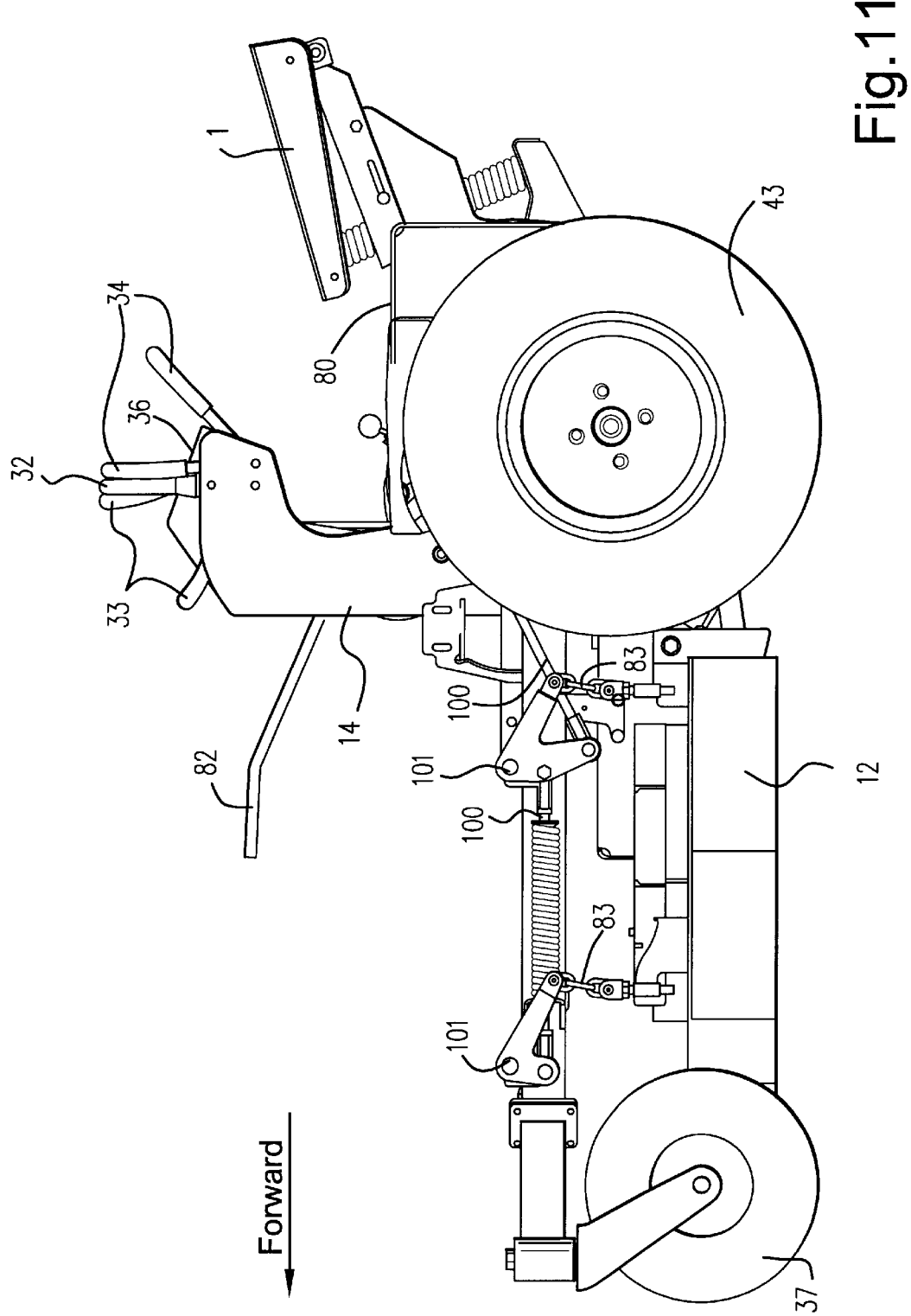
FIG. 11 is a side elevation view of the mower of FIGS. 9–10, showing the seat in a deployed position.
Figure 21:
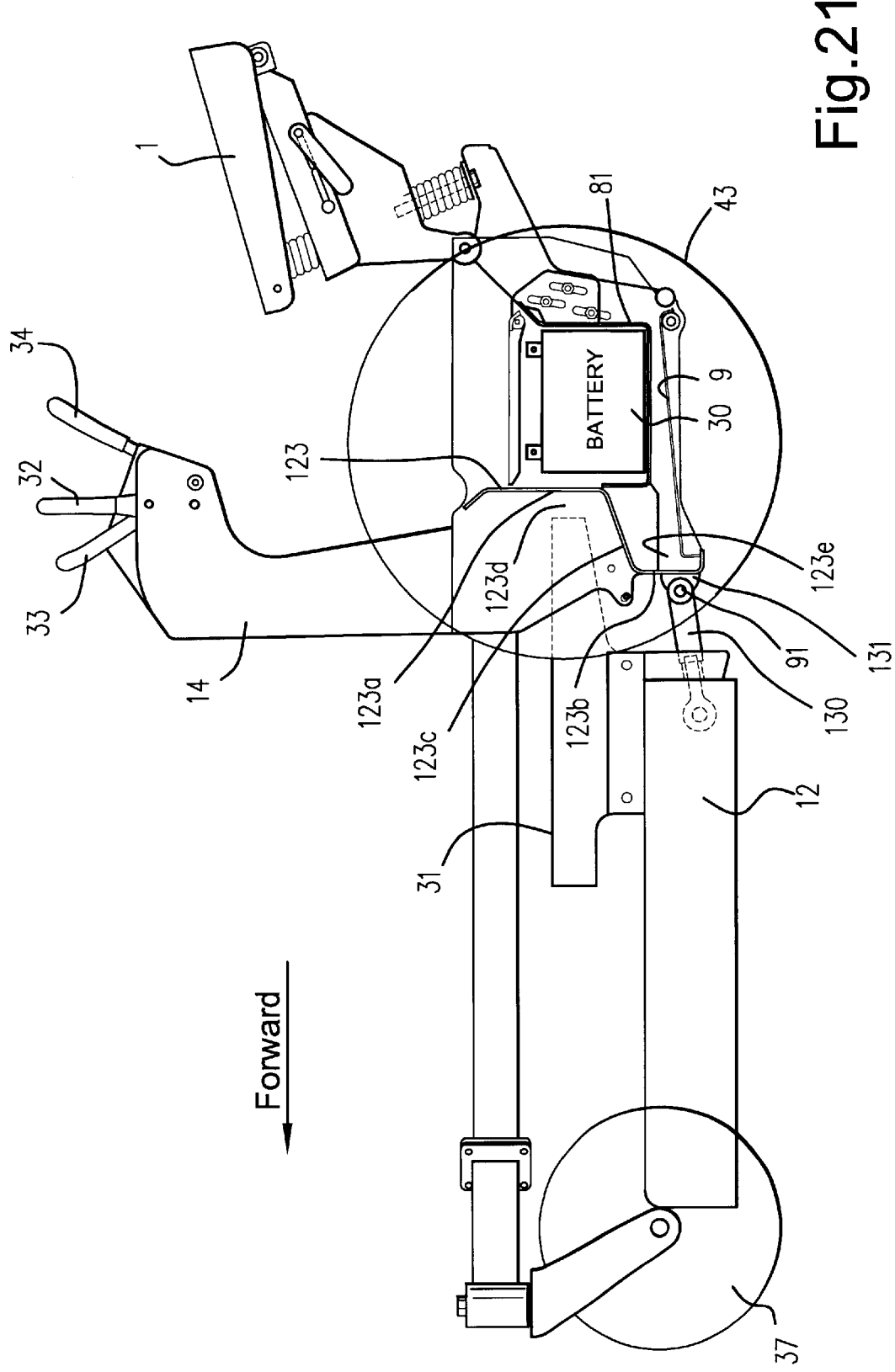
FIG. 21 is a side plan view of certain components of the mower of FIGS. 9–20, specifically illustrating the control arms which function to position the cutter and engine decks as they are moved upward and/or downward by the deck lift system (e.g., this figure shows the rear of the engine deck over top of the toe area of the operator).

Further regarding the deck lift system, in the embodiment of FIGS. 9–13, 21, 22, and 26–27, when deck lift lever 82 is pulled upwardly in a clockwise pivoting fashion ("clockwise" as defined from the port side of the mower as in FIGS. 10 and 11) by an operator, this causes a rod 99 (see FIG. 12) traversing the mower frame to also rotate in a clockwise direction. This rod, attached to deck lift rods 100 on either side of the mower, causes rods 100 to be pulled toward the rear of the mower so that lift brackets pivot counterclockwise about pivot axes 101 in order to lift the cutter deck assembly 12 together with the engine deck 31 and engine upwardly via chains 83 in order to raise the cut of the mower. In a similar manner, when lever 82 is lowered from a locked position, the weight of the deck assemblies and engine causes brackets 100 to rotate clockwise ("clockwise" as defined in, for example, FIG. 11) about axes 101 and rods 100 to move in a forward direction so that the cutter deck assembly 12 is lowered along with the engine deck 31 and engine. In this respect, control arms 130 (best shown in operation in FIG. 21) maintain the lateral position of the cutter deck assembly 12 and engine deck 31 (and the engine) during lower/raising by the deck lift system. As can be seen in FIG. 21, control arms 30 in this embodiment are much short than those in the '020 patent, so that mowers according to certain embodiments of this invention are better able to withstand sideloads applied to the deck assemblies.

Battery(ies) 30 (e.g., a DC battery) supplies electric power to mower components such as electric starting systems, optional lights, etc. As shown in FIGS. 13–16, at least a portion of battery 30 is located at an elevation below an elevation of a rotational axis (e.g., see 44 in FIG. 1) of one or both rear drive wheels 43, so as to lower the overall center of gravity of the mower. Moreover, in certain embodiments of this invention, the vertically oriented zero radius turning axis may intersect the batter due to its advantageous location. Because battery 30 and battery housing 81 are located on or above the foot platform 9 as shown in FIGS. 9, 10, 12–18, respective foot areas for respective feet of the operator are provided on opposite sides of the battery housing 81 on platform 9. Thus, battery 30 is preferably at least partially located between feet (or feet areas) of the operator during normal mower operation regardless of whether the operator is operating the mower in a standing mode while standing upright on platform 9 or operating the mower in a sitting mode while sitting on seat 1 with feet still on the platform 9 on opposite sides of the battery 30 (feet of the mower operator fit on the platform 9 on opposites sides of the battery 30 in a similar manner as shown in FIGS. 1, 2, 5 and 7).

Referring in particular to FIGS. 14–18, the seat assembly of this mower is unique and has several improvements relative to conventional seat assemblies. In particular, the seat assembly structure according to this fourth embodiment of this invention includes: seat 1; rear seat pivot 102; seat adjustment frame 103 including a pair of approximately parallel sidewalls connected by a cross member for enabling the seat 1 to be moved forward/rearward via slots 105; front seat spring 104 for operator comfort; front seat pivot 106 which enables the seat assembly to pivot between deployed and stowed positions; seat adjustment release lever 107; upper seat support frame member 108 including a pair of approximately parallel sidewalls 108a and 108b connected by cross member 108c; spring bolt 109 which extends through and along an axis of rear seat spring 110; lower seat support frame member 111 including a spring receiving surface 111a, a pair of approximately parallel sidewalls 111b and 111c, and a cross member 111a/111d connecting the sidewalls 111b and 111c; slots 112 for enabling frame 111 to move upward/downward so as to adjust the vertical position of seat 1; battery housing structure 81 including battery box rear wall 113, battery box bottom wall 121, battery box front wall 122, and pivoting battery box lid or top wall 124 which pivots at 124a (preferably, battery box sidewalls 115 are approximately parallel to another, as are the top wall 124 and the bottom wall 121 of the battery box); and finally tractor frame structure 114. Spring 104 is located under a front portion of seat 1 and the other spring 110 is located at least partially between seat supports 108 and 111. Preferably, support frames 108 and 111 are connected (the word "connected" herein means either directly connected or indirectly connected) to one another via pivot 106. Moreover, support frame 111 is connected to either the tractor frame or a deck structure via slots 112 with bolts therethrough so that the position of the seat assembly may be selectively adjusted.

In certain embodiments, foot platform 9 extends underneath of battery box 81 and defines a bottom wall thereof for supporting the battery thereon. Alternatively, the battery box 81 itself may include a bottom wall for supporting the battery 30 that is separate and distinct from the foot platform 9 upon which the operator may stand or rest his/her feet.

Tractor frame structure 114 includes (e.g., see FIGS. 14 and 17–20): tractor frame left sidewall 114a, tractor frame right sidewall 114b, tractor frame rear cross bar 116 connecting the two tractor frame sidewalls at respective rear edges thereof, battery box sidewalls 1 15, battery box rear wall 113, battery box bottom wall 121, battery box front wall 122, tractor frame cross member 123 for extending between and connecting/supporting the sidewalls, and control arm support tabs 131. Preferably, tractor frame sidewalls 114a and 114b are approximately parallel (i.e., parallel plus/minus 10 degrees in either direction) to one another, and cross member 123 is approximately perpendicular to the tractor frame sidewalls.

Figure 12:
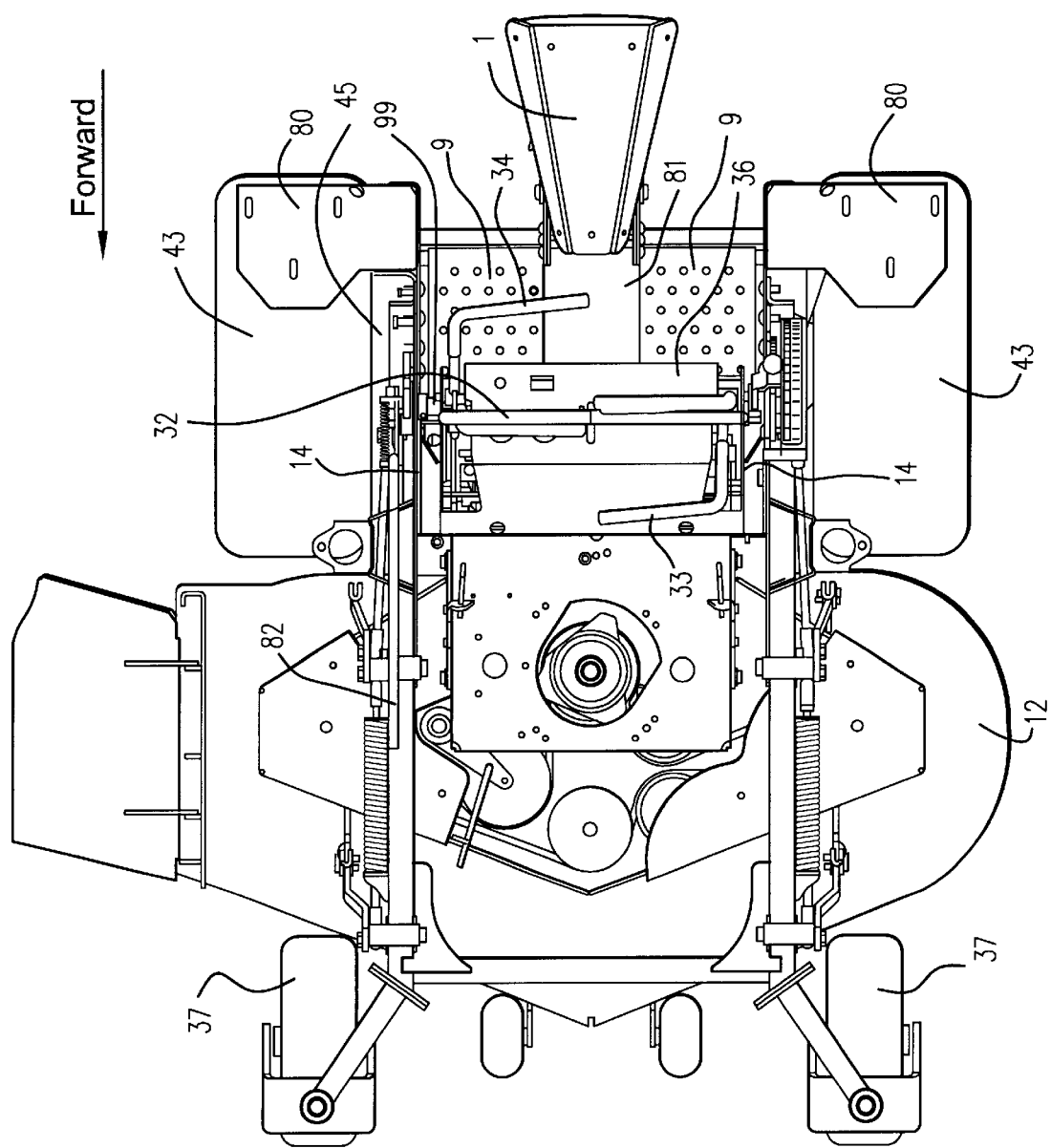
FIG. 12 is a top view of the mower of FIGS. 9–11.
Figure 13:
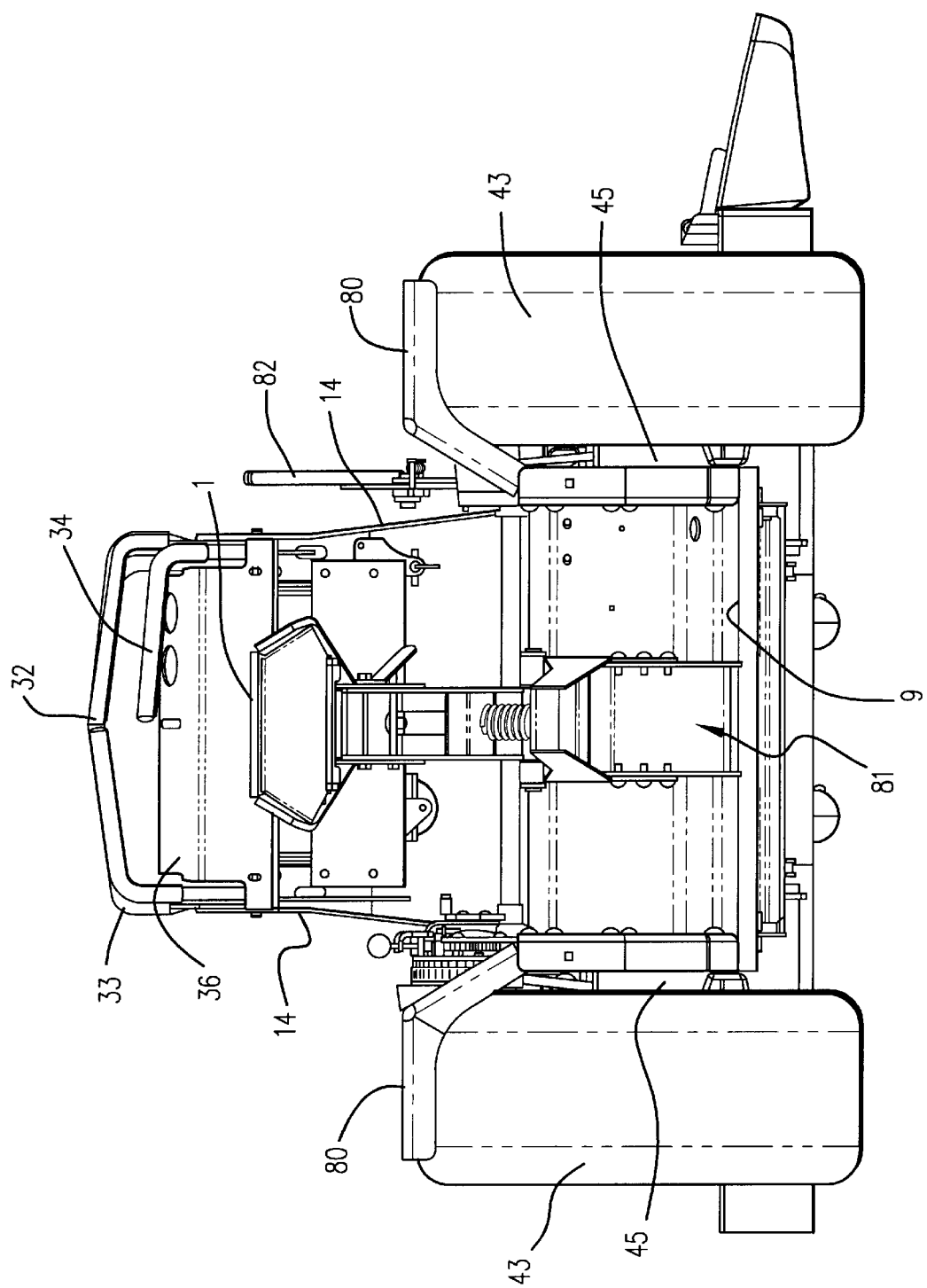
FIG. 13 is a rear elevation view of the mower of FIGS. 9–12.

As best shown in FIGS. 12–13, the unique shape and structure of tractor frame 114 enables wheel motors 45 which drive the respective rear drive wheels to be mounted to the respective exterior surfaces of the tractor frame sidewalls 114a and 114b. Wheel motors 45 are preferably mounted to the tractor frame 114 because the engine deck 31 and cutter deck assembly 12 move up/down selectively due to the deck lift system (i.e., it is not desirable to have the wheel motors moving up/down relative to the wheels/tires themselves). As shown in FIGS. 19–20, wheel motors (WM) 45 may be mounted to the exterior surfaces of the respective tractor frame sidewalls 114a and 114b at positions "WM." The parallel sidewalls of the tractor frames provide an excellent mounting position for the wheel motors 45. This also means that the rear drive wheels 43 are mounted to sidewalls 114a and 114b and are supported thereby (instead of to the engine deck as in certain conventional mowers). Additionally, the hydro pumps may be a mounted on a top surface of the tractor frame 114 or alternatively may be mounted on the engine deck 31.

As shown best in FIGS. 19 and 21, cross member or front wall 123 of the tractor frame is shaped so as to include approximately parallel portions 123a and 123b that are connected by angled portion 123c. Intermediate angled portion 123c forms an angle of from about 30–85 degrees with portion 123b, and an angle of from about 30–85 degrees with portion 123a. As shown in FIG. 21, the presence of angled portion 123c enables portions 123a and 123b to be approximately parallel to one another yet offset from one another thereby creating space 123d above angled portion 123c where the rear edge of engine deck 31 can move up and down during cutting height adjustment initiated by the deck lift system. In other words, the presence of angled portion 123 creates space 123d so that the space above the toes of the operator (the toes would be at area 123e) may be used for enabling the engine deck to move up/down.

Figure 15:
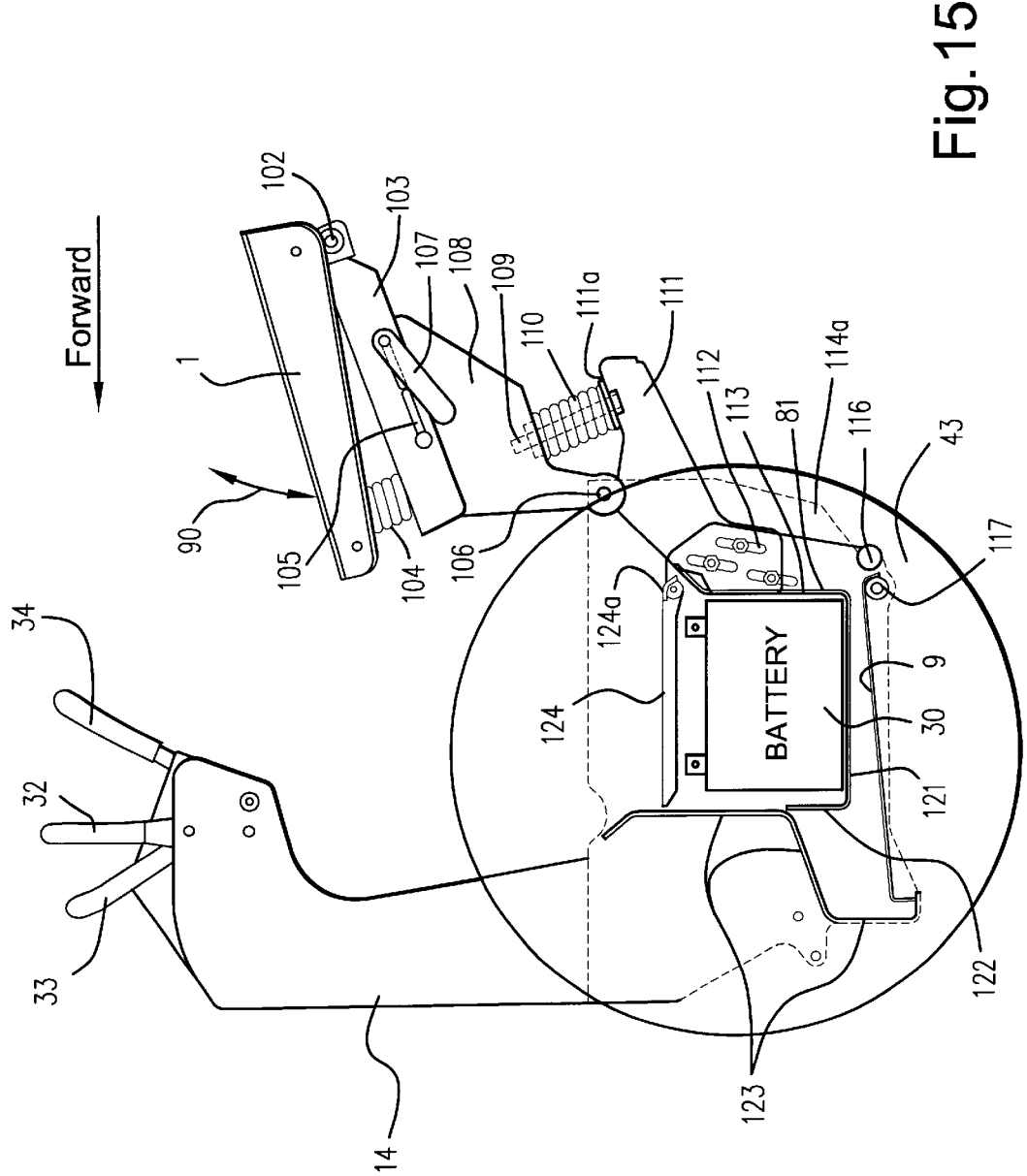
FIG. 15 is a side view of certain elements of the seat structure of the mower of FIGS. 9–14, illustrating the seat in a deployed position.
Figure 16:
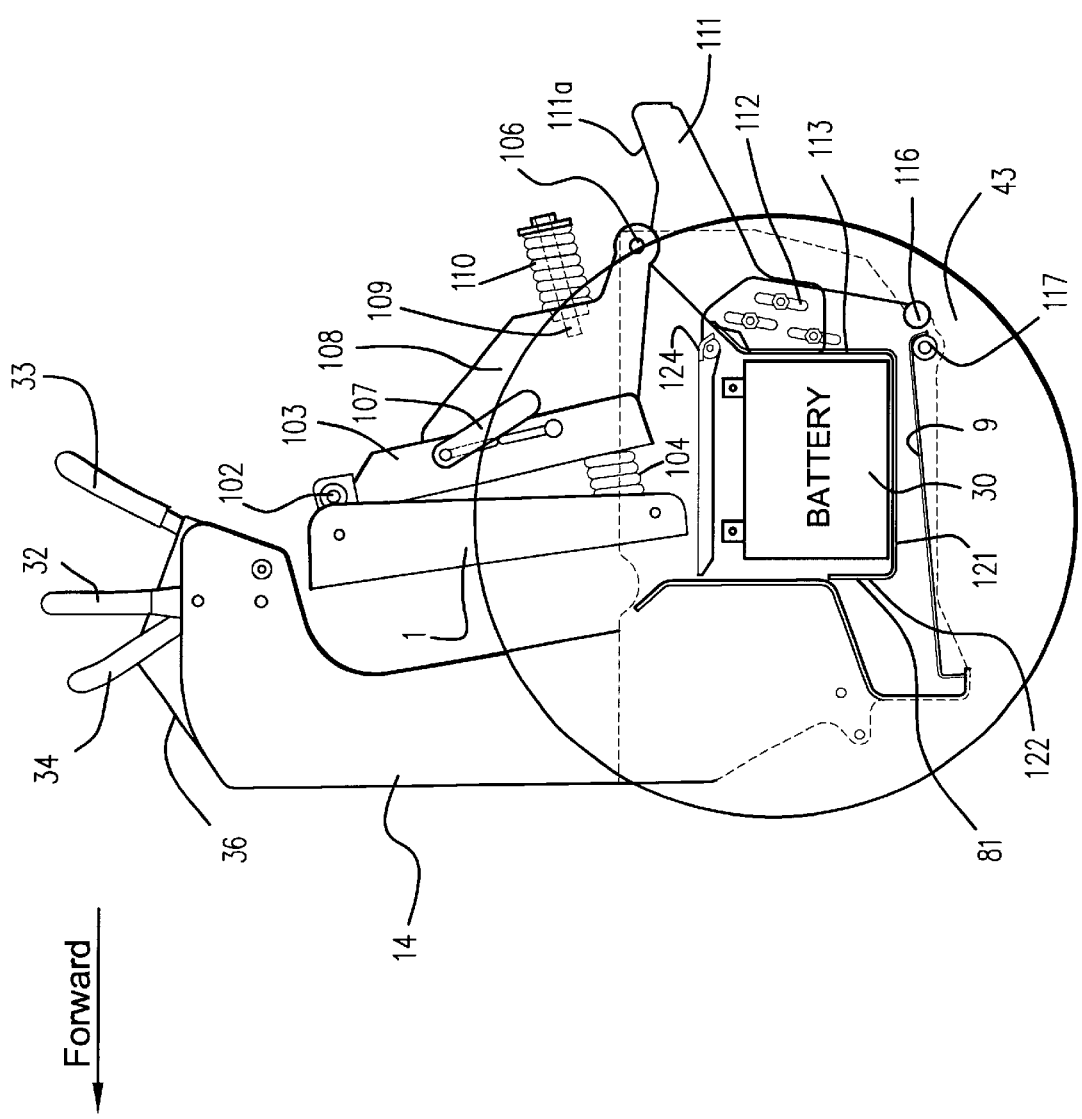
FIG. 16 is a side view of certain elements of the seat structure of the mower of FIGS. 9–15, showing the seat in a folded-up or non-deployed (i.e., stowed) position.
Figure 17:
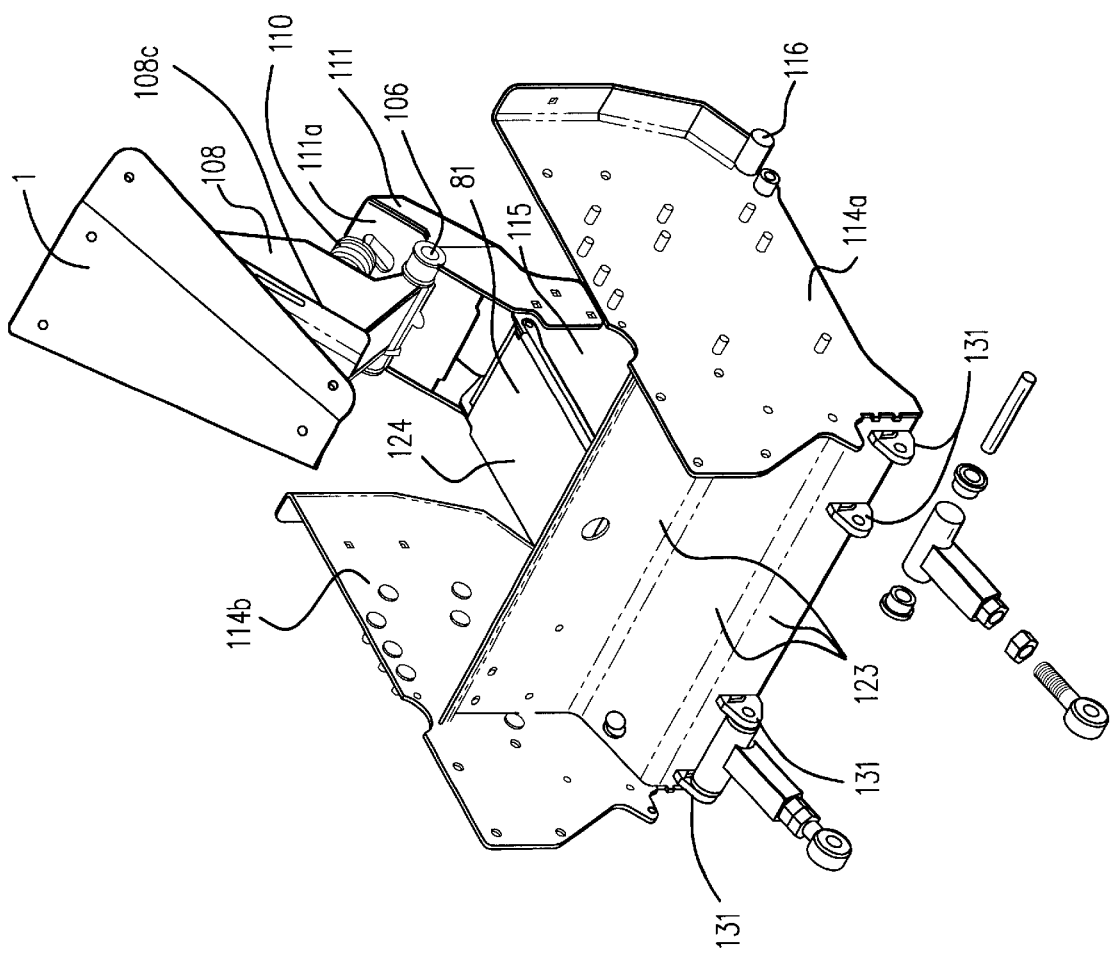
FIG. 17 is a perspective view of the seat structure attached to the tractor frame of the mower of FIGS. 9–16.

Referring to FIGS. 14–17, seat 1 is selectively movable between a deployed position and a stowed or non-deployed position. Seat 1 is illustrated in a deployed position in FIGS. 14 and 15, and in a stowed or non-deployed (i.e., folded up) position in FIG. 16. In FIG. 17 and FIG. 18, the seat 1 is halfway between the two positions and is in the process of either being deployed or stowed.

Figure 14:
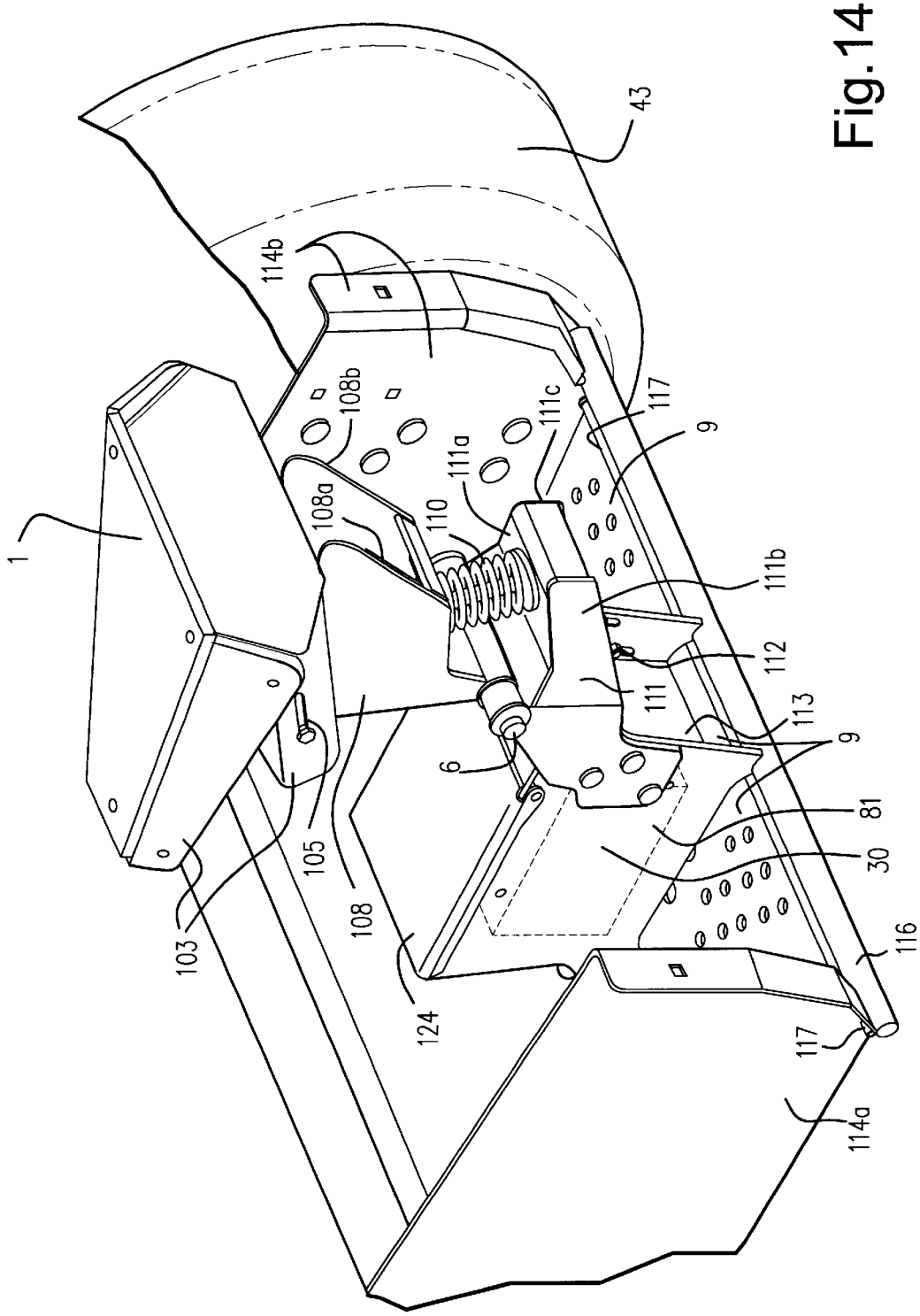
FIG. 14 is a perspective view of the seat assembly or structure of the mower of FIGS. 9–13.

In order to move seat 1 from its deployed position (FIGS. 14–15) to its stowed position (FIG. 16), the seat 1 along with seat adjustment frame 103, upper seat support frame member 108, and springs 104, 110 are pivoted forward (i.e., in a counterclockwise direction as defined in FIG. 15) about pivot axis 106 until the seat 1 reaches its stowed or non-deployed position as shown in FIG. 16. Likewise, in order to move seat 1 from its stowed position (see FIG. 16) to its deployed position (see FIGS. 14–15), seat 1 along with seat adjustment frame 103, upper seat support frame member 108, and springs 104 and 110 are pivoted clockwise about front seat pivot axis 106 until the pivoting movement is stopped by the bottom of spring 110 contacting surface 111a so that the seat thus reaches its deployed position as shown in FIGS. 14–15. As can be seen, springs 104 and 110 are connected to members 103 and 108, respectively, and thus move along with the seat 1 when the seat pivots between deployed and stowed positions.

As can be seen in FIGS. 14–17, seat 1 along with frame 108 pivot about axis 106 over a range of at least 45 degrees, more preferably at least about 60 degrees, to enable the seat to move from a deployed to a stowed position, or vice versa (even more preferably from about 70–120 degrees, and most preferably from about 75–100 degrees). This rather high degree of angular pivoting movement is enabled by the efficient and compact nature of the seat assembly. It is stressed that the particulars of the seat assembly shown in FIGS. 14–17 are for purposes of example only, and are not intended to be limiting; in other words, other types of seat structures consistent with one or more teachings herein may also be used in other embodiments of this invention.

As can be seen, front seat spring 104 and rear seat spring 110 are provided for operator comfort and function in a shock absorbing manner when the mower is being operated. Additionally, rear seat spring 110 (which is attached to upper seat support frame 108, and not to lower seat support frame 111) prevents seat 1 and support frame member 108 from pivoting too far rearwardly in the clockwise direction about pivot axis 106 (i.e., "clockwise" pivoting is defined as viewed in FIG. 15). In other words, when seat 1 is being moved from a stowed position to a deployed position, the bottom of spring 110 eventually hits the spring contacting surface 111a of support frame member 111 thereby stopping the clockwise movement of seat 1 and frame member 108 about axis 106 in order to define the deployed position for seat 1. In certain exemplary embodiments, surface 111a includes an aperture defined therein for receiving an end or head of bolt 109 when spring 110 comes to rest on surface 111a (as the seat goes down, the head of the bolt goes through the aperture but the washer and spring do not go through the aperture; the washer is between the bolt head and the spring end). Additionally, bolt 109 may be adjusted in order to both selectively change the biasing force provided by spring 110 and/or to adjust the angle at which seat 1 is normally located absent an operator.

As can be seen in FIGS. 14–18, seat 1 folds upwardly (toward its stowed position) and downwardly (toward its deployed position) about fixed axis 106, without the need for any pins to be pulled or the like. Springs 104 and 110 are positioned so that the entire seat unit (seat 1 along with springs 104 and 110, and frame members 103 and 108) pivots about axis 106 in a unitary manner. Additionally, the location of pivot axis 106 is located far enough rearwardly on the mower so that seat 1 is prevented from hitting supports 114 when pivoted to its stowed position (although the seat may come to rest up against same in the stowed position in certain embodiments of this invention). Moreover, pivot axis 106 is located at an elevation high enough so that the seat structure including seat 1 and frame members 103 and 108 can be made to have a low enough profile such that the mower does not prevent the seat from being moved between stowed and deployed positions. Pivot 106 is forward enough to enable the overall mower length to be rather short, but back far enough for the seat to clear the handle assembly. In this regard, pivot axis 106 is preferably located at an elevation greater than that of foot platform 9 and at an elevation also greater than that of top battery box wall 124. In most preferred embodiments, fixed pivot axis 106 is located at an elevation greater than the elevation of the rotational axis of the rear drive wheels 43, although it may be located lower than same in certain embodiments. Additionally, fixed seat pivot axis 106 is preferably located rearwardly of the rear drive wheel axis (of one or both rear drive wheels 43) and optionally may also be located rearwardly of the rear edge of foot platform 9.

As shown in FIG. 15, springs 104 and 110 have respective axes which are approximately parallel to one another both in deployed and stowed positions. In this regard, the respective axes of springs 104 and 110 define an angle with respect to one another of from about 0 to 15 degrees as viewed from the side as in FIGS. 15, more preferably of from about 0 to 8 degrees. This approximately parallel alignment of the axes of springs 104 and 110 has been found to provide for a more comfortable ride for the seated operator and for an efficient seat assembly system. Additionally, while only a single spring 104 and a single spring 110 are shown in FIGS. 14–18, it will be recognized by those skilled in the art that additional springs may be provided.

Pivots 102 and 106 are approximately parallel to one another, and may enable the seat to pivot in opposite directions. As for rear seat pivot 102, it enables seat 1 to pivot in directions 90 about axis 102. Thus, pivot axis 102 functions to enable spring 104 to cushion the ride of an operator seated on seat 1 especially in the forward direction when the operator is leaning forward on the seat 1. In preferred embodiments, rear seat pivot axis 102 is located at an elevation above front pivot axis 106, and is also located rearwardly of both axis 106 and rearwardly of the rear edge of rear drive wheels 43 (although this need not be the case in all embodiments of this invention).

The position of seat 1 may also be adjusted upwardly and downwardly via slots 112, as well as forwardly/rearwardly via slots 105. The selective adjustability of seat 1 is advantageous in that the seat assembly may more easily accommodate operators of different sizes.

The positioning of battery 30 in box or housing 81 at a location at least partially below an axis of at least one of the rear drive wheels enables a lower center of gravity of the mower thereby enabling safe mower operation. The lower the center of gravity, the less likely the mower is to tip when travelling on hills or the like. Moreover, positioning of battery 30 between the feet of the operator above platform 9 utilizes space which otherwise may not have been used. This location of the battery also enables it to be positioned further rearwardly than would otherwise have been permitted thereby achieving the result of moving the center of gravity of the mower further rearwardly in order to provide for smoother and more efficient mower operation.

Yet another advantage associated with the seat structure shown in FIGS. 14–18 is that the operator can operate the mower in a standing mode (i.e., the operator stands upright on platform 9) regardless of whether seat 1 is in a deployed position (FIGS. 14–15) or in a stowed or non-deployed position (FIG. 16). Thus, the operator may easily lift up off of the seat when going up hills and quickly sit back down if desired. Alternatively, if the operator desires to operate the mower in a standing mode for an extended period of time, the operator can stow the seat as shown in FIG. 16 and thereafter operate the mower while standing on platform 9. The low profile of the seat and compact nature of the seat assembly as illustrated in FIGS. 14–18 enables the seat assembly to be small enough so that it does not interfere with operation of the mower by a standing operator regardless of whether the seat 1 is deployed or not.

Another unique feature associated with the fourth embodiment of this invention relates to control arms 130 and is best illustrated in FIGS. 21–22 and 26–27. It is again noted that cutter deck assembly 12 is rigidly affixed to engine deck 31 (with the engine thereon) so that the two deck assemblies may be raised and lowered together as one unitary structure by the deck lift system of this mower (e.g., as initiated by deck lift lever 82). End 92 of each control arm 130 is pivotally connected to the cutter deck assembly 12 while the other end 93 of each control arm is pivotally connected to the tractor frame structure 114 at pivot axis 91 (e.g., see FIGS. 21–22). Control arms 130 function to maintain the desired lateral position of deck assemblies 12, 31 throughout their range of movement. In this regard, control arms 130 are pivotally connected to, and extend between, both cutter deck assembly 12 on the one hand and tractor frame 114 on the other hand. Thus, when deck assemblies 12 and 31 are raised by the deck lift system, control arms 130 pivot upwardly about axis 91 in direction "A" (see FIG. 26). Axis 91 is defined by the apertures or holes provided in control arm support tabs 131. In a similar manner, when the deck assemblies 12, 31 are lowered by the deck lift system, control arms 130 pivot downwardly in direction "B" (i.e., counterclockwise as shown in FIG. 21) about pivot axis 91.

As shown in FIGS. 26–27, control arms 130 may be of different lengths in different embodiments of this invention. However, in both the FIG. 26 and the FIG. 27 embodiments, control arms 130 are significantly shorter than conventional control arms. In particular, with regard to FIG. 26, control arms 130 according to this invention are preferably short enough so that they must pivot at least about 29° (see the angle Φ in FIG. 26) about axis 91 in order to move the cutter deck assembly upwardly or downwardly over a vertical distance "d" of five (5) inches. Preferably, in order to move the cutter deck assembly 12 (and thus also the engine deck and engine) up or down five inches, the control arms 130 according to this invention preferably are pivoted about axis 91 from about 27–80°, more preferably from about 30–60°, and most preferably from about 30–50° (theses are the full range of movement for the control arms 130 for cutting positions of the cutter deck and corresponding blades). In other embodiments of this invention, pivoting of the control arms 130 fifteen (15) degrees about axis 91 causes the cutter deck assembly 12 to move either vertically upward or vertically downward no more than about 2.5 inches, and more preferably no more than about 2.0 inches and most preferably no more than about 1.8 inches (these vertical distances "d" are measured irrespective of how much the deck may move laterally forward or rearward during the lift due to the pivoting of arms 130 about axis 91).

The shorter control arms 130 of this invention enable a more compact and efficient mower. Moreover, the shorter control arms enable the mower to withstand additional sideload (e.g., when deck assembly 112 is impacted from the side). The longer the arms, the more adverse the effects of sideload. Shorter control arms are enabled in accordance with the instant invention because the cutter deck assembly 12 is rigidly connected to the engine deck 31 and the two deck assemblies move upwardly and downwardly together in order to adjust the cut height of the mower. Conventional deck lift systems typically require longer control arms because the cutter deck assembly is separate from the engine and the two do not move upwardly and downwardly together during deck lift operations. Thus, because conventional mowers have engines separate from the cutter deck, it is undesirable to have to significantly compensate the belt drive system for significant back and forth lateral movement which accompanies large angular pivoting movements of control arms. Because our engine deck and engine is moved along with the cutter deck assembly, the instant invention can afford to have the deck assemblies move laterally rearward/forward along with up/down movement and thus can accommodate shorter control arms 130 because the belt drive system between the engine drive shaft and the cutter blades is not changed (i.e., the distance between the two remains approximately constant) during deck lifting/lowering operations.

Figure 22:
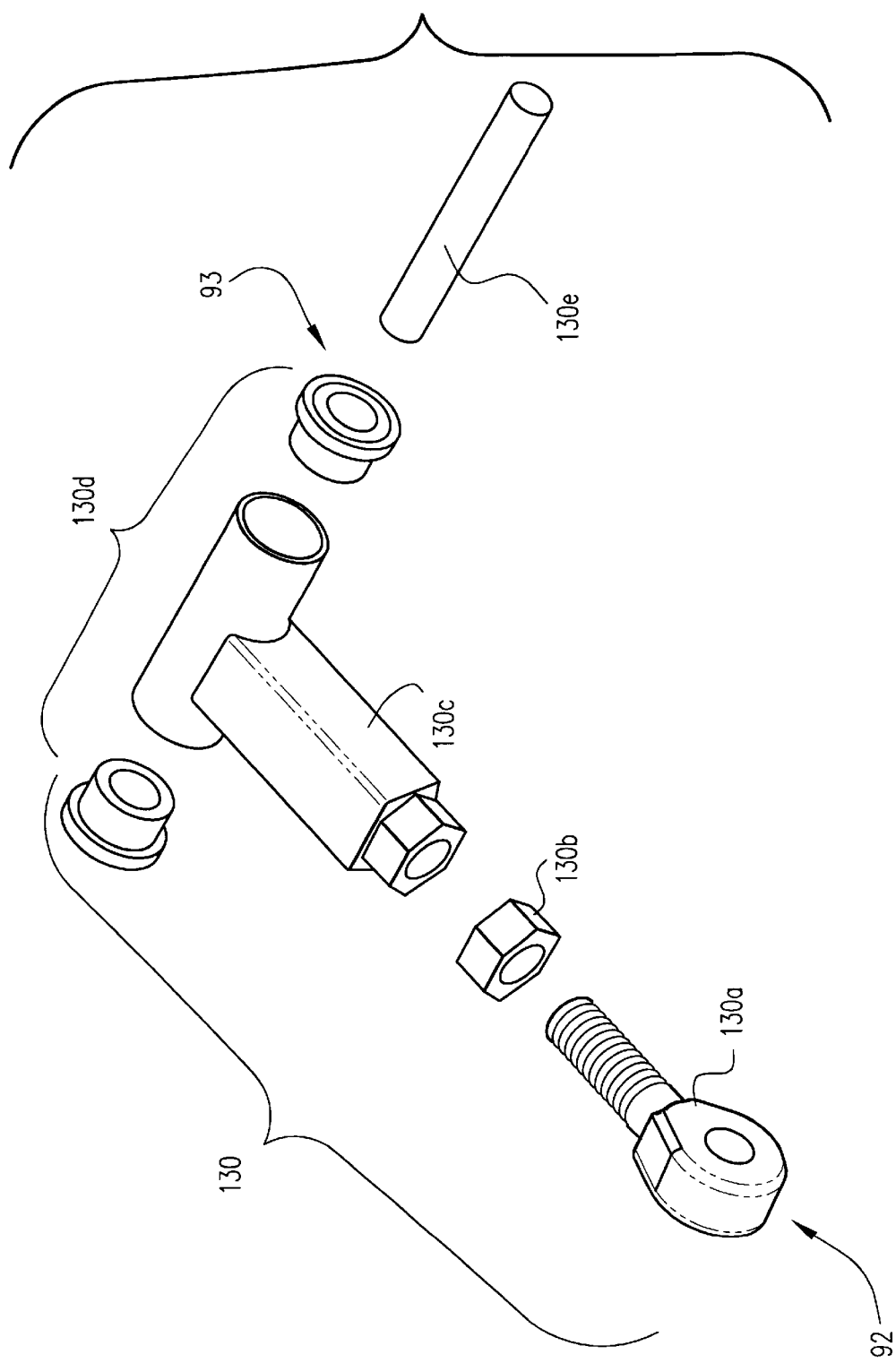
FIG. 22 is an exploded perspective view of an exemplary control arm of the mower of FIGS. 9–21.
Figure 23:
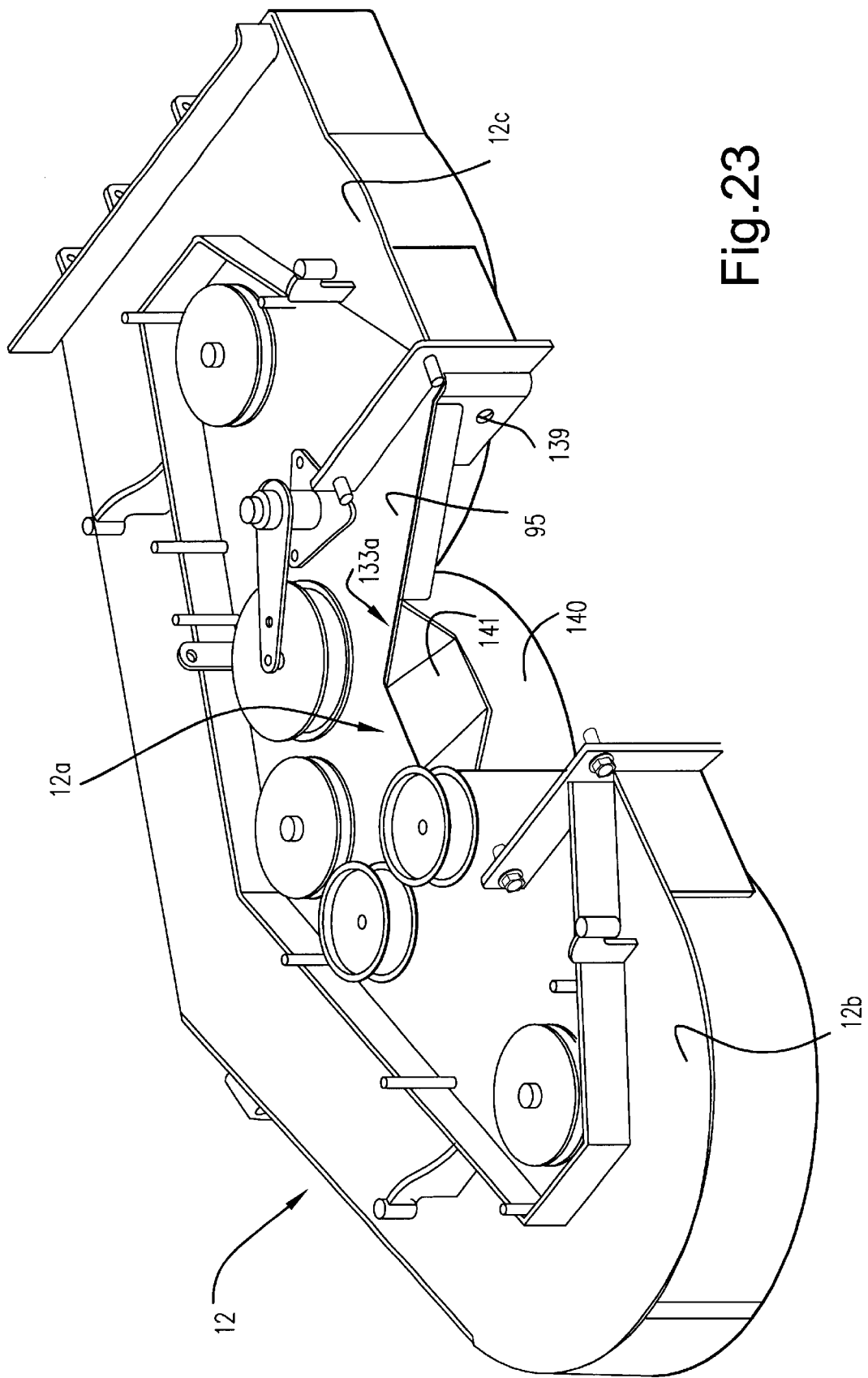
FIG. 23 is a perspective view from above and behind, illustrating the cutter deck assembly with blade drive pulleys thereon, of the mower of FIGS. 9–22.

FIG. 22 is an exploded view of a control arm which may be utilized in conjunction with this invention. Control arm 130 includes adjustable rod end 130a (ball socket), nut 130b for locking rod end 130a from movement (i.e., to prevent wear), control arm weldment 130c, shock absorber rubber (e.g., neoprene) bushings 130d, and spanner pipe or tube 130e =1 which extends through bushings 130d and the elongated tubular section of control arm weldment 130c.

Yet another unique aspect of this fourth embodiment of this invention is best illustrated in FIGS. 23–25 and 28. In particular, an angled section at 12a of the cutter deck assembly 12 between lobes 12b and 12c is cut out or removed and covered up by a fill or plug plate 141. The corner defined by 95 and 140 that is removed at area 12a enables the height or profile of the cutter deck assembly at that location to be reduced. The lower profile of the cutter deck assembly at the location of plate 141 enables more room for the engine clutch which extends downwardly from a position above plate 141 (e.g., see FIGS. 25 and 28). Clutch 142 is illustrated from above in FIG. 25.

The cutter deck includes top deck surface 95 which defines the plane of the cutter deck, as well as deck sidewall 140 which extends generally downward from top surface 95. FIG. 28 is a cross-sectional view of the cutter deck assembly 12 taken along the center of plate 141 of FIG. 23. Referring in particular to FIG. 28, plate 141 covers the cutout or hole in the cutter deck by extending between and connecting cutter deck sidewall 140 with cutter deck top surface 95. Welds 96 or any other suitable means may be utilized to secure plate 141 to the cutter deck in this regard. Plate 141 preferably defines an angle Ω of from about 15–75 degrees with top surface 95 of the cutter deck, more preferably of from about 25–65 degrees, and most preferably an angle Ω of from about 35–55 degrees. Plate. 141 is located at the rear center edge of the cutter deck between lobes 12b and 12c. Again, this enables clutch 142 as shown in FIGS. 25 and 28 to be located at a lower elevation than would otherwise be possible. The provision of plate 141 (as opposed to a right angle connection between cutter deck members 95 and 140) also enables easier installation/removable of clutch 142 and the blade belt driven by the clutch. By enabling the clutch and thus the engine to be located at a lower elevation, a lower center of gravity of the mower is possible.

Once give the above disclosure, many other features, modifications, and improvements will become apparent to the skilled artisan. Such other features, modifications, and improvements are therefore considered to be a part of this invention, the scope of which is to be determined by the following claims.

What is claimed is:

1. A self-propelled power lawn mower comprising:
   first and second rear drive wheels that are independently drivable so as to enable the mower to conduct approximate zero radius turns about a zero radius turning axis;
   a foot platform for supporting at least one foot of an operator of the mower, said foot platform being located at an elevation less than an elevation of a top edge of at least one of said rear drive wheels, said foot platform including a first portion for supporting a right foot of the operator and a second portion for supporting a left foot of the operator;
   a battery housing for housing a battery at a location such that at least a portion of the battery is positioned between feet of the operator and at least a portion of the battery is located at an elevation below an elevation of a horizontally aligned rotational axis of at least one of the rear drive wheels, wherein said battery housing includes first and second approximately parallel sidewalls which extend upwardly in a vertical manner above said foot platform, and wherein at least one of said sidewalls supports a seat assembly of the mower; and
   wherein the battery is located between said first and second vertically extending sidewalls of the battery housing, and the battery is located at least partially between the first and second portions of the foot platform so that the battery is at least partially between the right and left feet of the operator during normal mower operation.

2. The mower of claim 1, wherein said battery is at least partially located between the first and second rear drive wheels.

3. The mower of claim 2, wherein said battery is located entirely between the first and second rear drive wheels.

4. The mower of claim 1, wherein said battery housing further includes a lid for covering the battery, wherein the lid may pivot between an open position and a closed position, wherein said lid is located at an elevation below an elevation of a top edge of each of said rear drive wheels.

5. The mower of claim 1, wherein a substantial portion of said battery housing is located directly above said foot platform.

6. The mower of claim 1, wherein said foot platform forms a bottom wall of said battery housing for supporting said battery.

7. The mower of claim 1, wherein a vertically oriented zero radius turning axis of the mower intersects the battery.

8. The mower of claim 1, further comprising a tractor frame including first and second vertically extending tractor frame sidewalls, and wherein the battery and the battery housing are located at least partially between the tractor frame sidewalls.

9. The mower of claim 8, further comprising an elongated bar extending between said tractor frame sidewalls, and wherein said tractor frame housing is at least partially supported by said elongated bar.

10. The mower of claim 1, wherein the entire seat is located rearwardly of the battery when the seat is in a deployed position during normal operating conditions.

* * * * *